(12) United States Patent
Peng et al.

(10) Patent No.: US 11,488,157 B2
(45) Date of Patent: Nov. 1, 2022

(54) COMPLEX SYSTEM FOR INFORMATION PROCESSING

(71) Applicant: Tencent Technology (Shenzhen) Company Limited, Guangdong (CN)

(72) Inventors: Ying Peng, Guangdong (CN); Chuming Tang, Guangdong (CN); Bei Zhang, Guangdong (CN); Chong Wang, Guangdong (CN); Cheng Cheng, Guangdong (CN); Cuixia Li, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 73 days.

(21) Appl. No.: 16/985,782

(22) Filed: Aug. 5, 2020

(65) Prior Publication Data

US 2020/0364702 A1    Nov. 19, 2020

Related U.S. Application Data

(63) Continuation of application No. PCT/CN2019/082437, filed on Apr. 12, 2019.

(30) Foreign Application Priority Data

May 9, 2018  (CN) .......................... 201810437904.9

(51) Int. Cl.
*G06Q 20/38* (2012.01)
*G06F 16/383* (2019.01)
(Continued)

(52) U.S. Cl.
CPC ......... *G06Q 20/384* (2020.05); *G06F 16/383* (2019.01); *G06F 40/205* (2020.01);
(Continued)

(58) Field of Classification Search
CPC .............. G06Q 20/384; G06Q 20/108; G06Q 20/3223; G06Q 20/386; G06Q 40/02;
(Continued)

(56) References Cited

U.S. PATENT DOCUMENTS 9,721,239 B1 * 8/2017 Ho ........................ G06Q 20/384
11,012,386 B2 * 5/2021 Lee ......................... H04L 51/16
(Continued)

FOREIGN PATENT DOCUMENTS

CN    105938604 A * 9/2016 ........... G06Q 20/123
CN    106293716 A    1/2017
(Continued)

OTHER PUBLICATIONS

Sohu.com: Rain of gold coin, rain of banknotes, and custom emoji packs, Don't you ask for red envelopes for these Easter eggs opn WebChat?Jan. 26, 2017, pp. 1-11 (Year: 2017).*
(Continued)

*Primary Examiner* — Bijendra K Shrestha
(74) *Attorney, Agent, or Firm* — Crowell & Moring LLP

(57) ABSTRACT

An information processing method, a server, a mobile terminal, and a storage medium, to trigger value transfer through chat information, and improve a conversion rate of a social platform are discussed. An embodiment provides an information processing method. The method may include receiving, by a server, a value packet transmitting instruction, the value packet transmitting instruction being transmitted after a key word extracted from chat information by a first mobile terminal is matched with a key word library. The method may further include transmitting, by the server, value packet transfer information to a second mobile terminal.

18 Claims, 11 Drawing Sheets

(51) Int. Cl.
*G06F 40/279* (2020.01)
*G06F 40/205* (2020.01)
*G06Q 20/10* (2012.01)
*G06Q 20/32* (2012.01)
*G06Q 50/00* (2012.01)
*H04L 51/046* (2022.01)
*G06Q 40/02* (2012.01)

(52) U.S. Cl.
CPC ......... *G06F 40/279* (2020.01); *G06Q 20/108* (2013.01); *G06Q 20/3223* (2013.01); *G06Q 20/386* (2020.05); *G06Q 50/01* (2013.01); *H04L 51/046* (2013.01); *G06Q 40/02* (2013.01)

(58) Field of Classification Search
CPC .... G06F 16/383; G06F 40/205; G06F 40/279; H04L 51/046
See application file for complete search history.

(56) References Cited

U.S. PATENT DOCUMENTS

| | | | | |
|---|---|---|---|---|
| 2011/0082942 | A1* | 4/2011 | Takei | G06Q 10/00 709/227 |
| 2014/0074951 | A1* | 3/2014 | Misir | H04L 12/1827 709/206 |
| 2016/0321624 | A1* | 11/2016 | Brunner | H04W 4/14 |
| 2017/0200202 | A1* | 7/2017 | Yu | G06Q 30/0277 |
| 2021/0194712 | A1* | 6/2021 | Paluch | H04L 12/185 |

FOREIGN PATENT DOCUMENTS

| | | | | |
|---|---|---|---|---|
| CN | 107332755 | A | 11/2017 | |
| CN | 107608583 | A * | 1/2018 | ............... G06F 9/54 |
| CN | 107818458 | A | 3/2018 | |
| CN | 108335089 | A * | 7/2018 | ............. G06Q 20/06 |

OTHER PUBLICATIONS

Jing, M.: Red Envelopes helps WeChat Capture mobile payment, Feb. 25, 2015, China Daily, pp. 1-4 (Year: 2015).*
Fu, Beimeng: Millions of People are Hooked on this Game where You Give Money Away, Feb. 23, 2016, BuzzFeed News, pp. 1-34. (Year: 2016).*
Huang et al.: Explore Development of WeChat Payment from User Behavior, 2015, IEEE/ACM, pp. 1-4. (Year: 2015).*
(Anonymity), (Non-official Translation) "Gold Coins Rain, Banknote Rain, You Can Also Customize Emoticons, How Could You Get Red Packets If You Don't Know These Wechat Bonus of Spring Festival?!" http://www.sohu.com/a/125190145_391259, Jan. 26, 2017 (Jan. 26, 2017), pp. 1-3.
(Anonymity), (Non-official translation) "2015 the Year of the Sheep CCTV Spring Festival Gala Turns into a Red Packet War, Wechat Shake Reaches 11 Billion Times that Night," https://www.guancha.cn/life/2015_02_19_309921_s.shtml, Feb. 19, 2015 (Feb. 19, 2015), pp. 5-6.
International Search Report for International application No. PCT/CN2019/082437, dated Jul. 1, 2019.
Written Opinion for International application No. PCT/CN2019/082437, dated Jul. 1, 2019.

* cited by examiner

 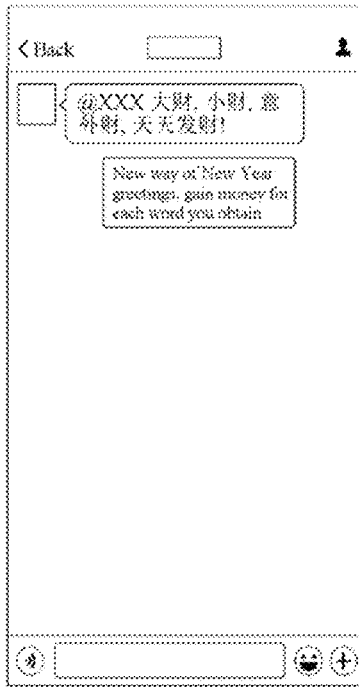 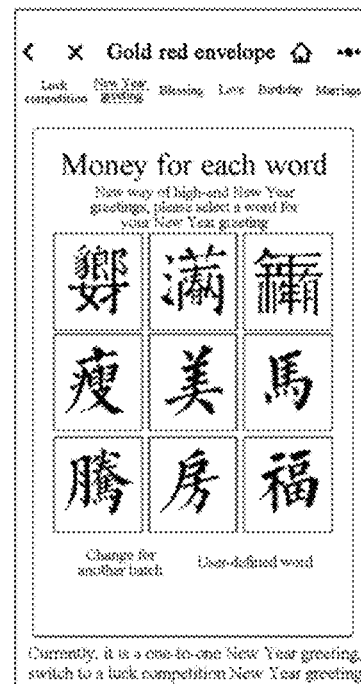
FIG. 7-a
 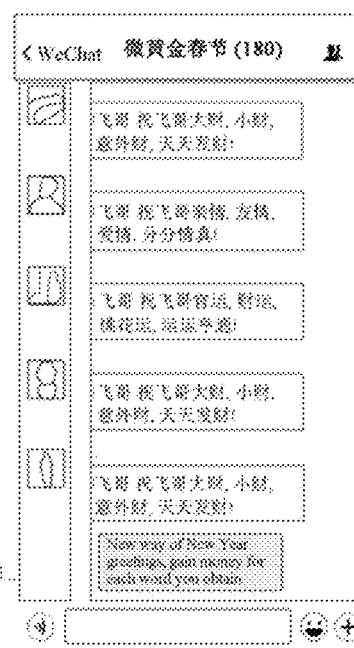 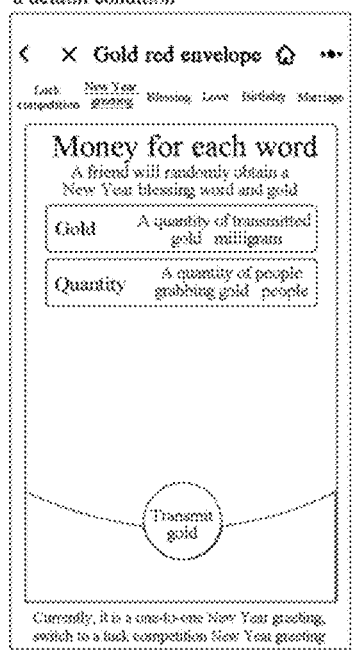
FIG. 7-b

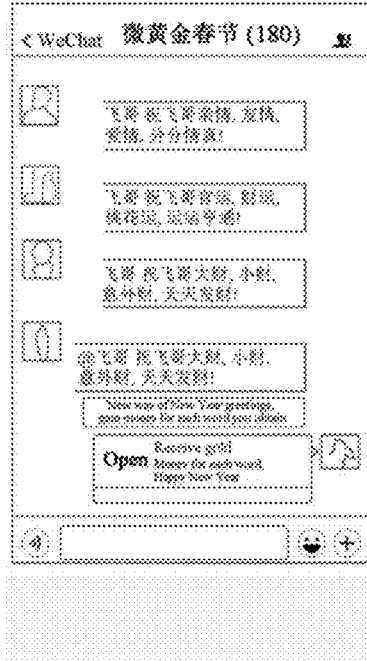 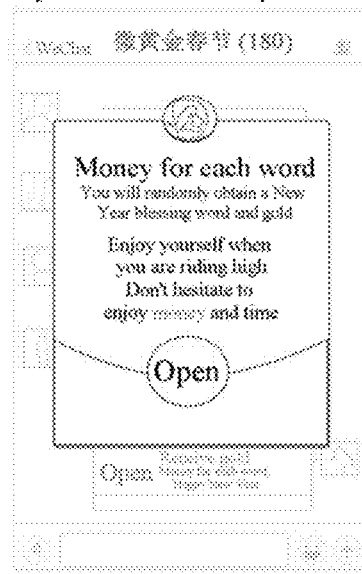 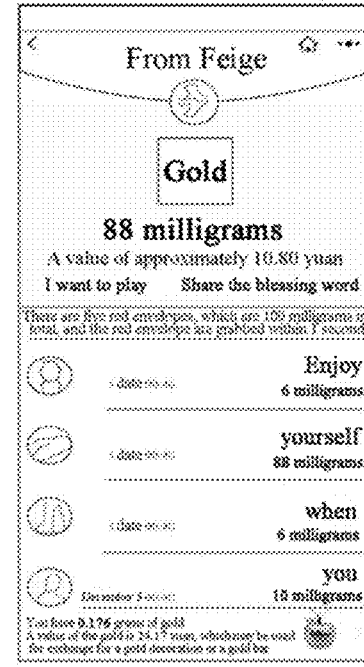
FIG. 7-e
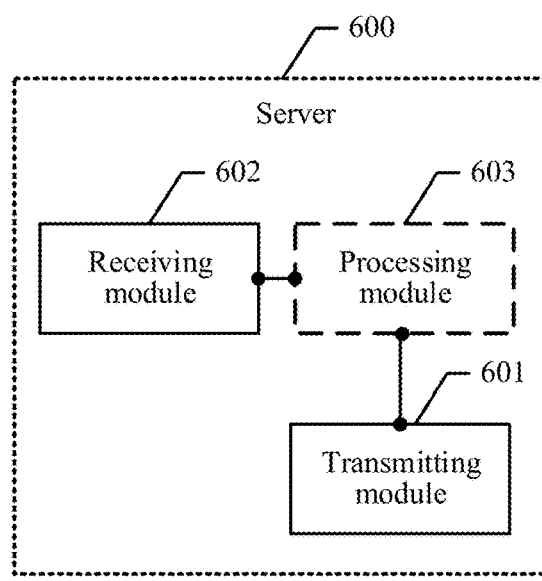
FIG. 8

COMPLEX SYSTEM FOR INFORMATION PROCESSING

RELATED APPLICATION

This application claims priority to and is a continuation of PCT Patent Application No. PCT/CN2019/082437 filed Apr. 12, 2019, entitled "INFORMATION PROCESSING METHOD, SERVER, AND MOBILE TERMINAL", which is incorporated herein by reference in its entirety. PCT Patent Application No. PCT/CN2019/082437 claims priority to Chinese Patent Application No. 201810437904.9, filed with the National Intellectual Property Administration, PRC on May 9, 2018 and entitled "INFORMATION PROCESSING METHOD, SERVER, AND MOBILE TERMINAL", which is incorporated herein by reference in its entirety.

FIELD OF THE TECHNOLOGY

Embodiments relate to the field of computer technologies, and in particular, to an information processing method, a server, a mobile terminal, and a storage medium.

BACKGROUND OF THE DISCLOSURE

With continuous development and promotion of Internet-based transactions, an electronic payment envelope created based on mobile payment has gradually merged into life of users, and has become an important composition part of social interaction, transactions, and entertainment in life.

SUMMARY

Embodiments provide an information processing method, a server, a mobile terminal, and a storage medium, to trigger value transfer through chat information, and improve a conversion rate of a social product.

An embodiment provides an information processing method. The method includes receiving, by a server, a value packet transmitting instruction, the value packet transmitting instruction being transmitted after a key word extracted from chat information by a first mobile terminal is matched with a key word library; and the method includes transmitting, by the server, value packet transfer information to a second mobile terminal.

An embodiment further provides an information processing method. The method includes extracting, by a first mobile terminal, a key word from chat information, and matching the key word with a key word library. The method includes transmitting, by the first mobile terminal, a value packet transmitting instruction in a case that the key word is successfully matched.

An embodiment provides an information processing method. The method includes receiving, by a second mobile terminal, value packet transfer information, the value packet transfer information being transmitted by a server after a value packet transmitting instruction is received, and the value packet transmitting instruction being transmitted after a key word extracted from chat information by a first mobile terminal is matched with a key word library. The method includes obtaining, by the second mobile terminal, a transfer instruction for transferring a value packet in the value packet transfer information.

An embodiment provides a server, including a processor and a memory. The processor and the memory communicate with each other. The memory is configured to store an instruction. The processor is configured to execute the instruction in the memory, to perform the steps. The steps include receiving a value packet transmitting instruction, the value packet transmitting instruction being transmitted after a key word extracted from chat information by a first mobile terminal is matched with a key word library. The steps include transmitting value packet transfer information to a second mobile terminal.

An embodiment provides a mobile terminal including a processor and a memory The processor and the memory communicate with each other. The memory is configured to store an instruction. The processor is configured to execute the instruction in the memory, to perform the steps. The steps include extracting a key word from chat information, and matching the key word with a key word library. The steps include transmitting a value packet transmitting instruction in a case that the key word is successfully matched.

An embodiment provides a mobile terminal, including: a processor and a memory, the processor and the memory communicate with each other. The memory is configured to store an instruction. The processor is configured to execute the instruction in the memory, to perform the steps. The steps include receiving value packet transfer information, the value packet transfer information being transmitted by a server after a value packet transmitting instruction is received, and the value packet transmitting instruction being transmitted after a key word extracted from chat information by a first mobile terminal is matched with a key word library. The steps include obtaining a transfer instruction for transferring a value packet in the value packet transfer information.

An embodiment provides a non-transitory computer-readable storage medium, storing an instruction, the instruction, when run on a computer, causing the computer to perform the foregoing information processing method.

BRIEF DESCRIPTION OF THE DRAWINGS

To describe the technical solutions in the embodiments more clearly, the following briefly introduces the accompanying drawings to aid in describing some example embodiments. The accompanying drawings in the following description show some embodiments of the principles and architectures described in this application, and a person skilled in the art may still derive other drawings from these accompanying drawings.

An electronic payment envelope is based on social media platforms. Types of currently common electronic payment envelopes include a one-to-one payment envelope, a one-to-many payment envelope, a shake payment envelope, and a password payment envelope. However, the payment envelopes generally focus on a social instant messenger (IM), and a user may transmit and receive a payment envelope anytime and anywhere when there is a network.

FIG. 7-*a* is a schematic diagram of triggering a one-to-one payment envelope entry through a key word in a chat context.

FIG. 7-*b* is a schematic diagram of triggering a one-to-many payment envelope entry through a key word in a chat context.

FIG. 7-*c* is a schematic diagram of an interface, which is configured by a user transmitting a payment envelope, for transmitting a payment envelope.

FIG. 7-*d* is a schematic diagram of a window in which a user transmitting a payment envelope modifies a text content in a displayed content.

FIG. 7-*e* is a schematic diagram of an interface for receiving a payment envelope.

FIG. 8 is a schematic structural diagram of a server.

DESCRIPTION OF EMBODIMENTS

Embodiments discussed herein provide an information processing method, a server, and a mobile terminal, to trigger value transfer through chat information, and improve a conversion rate of a social media platform.

To make the invention objectives, features, and advantages of the embodiments clearer and more comprehensible, the following clearly and completely describes the technical solutions in the embodiments with reference to the accompanying drawings in the embodiments. The embodiments described as follows are some of the embodiments of the principles and architectures described in this application.

The terms "include", "contain" and any other variant thereof in the specification, claims, and accompanying drawings are intended to cover a non-exclusive inclusion, so that a process, a method, a system, a product, or a device that includes a series of units is not necessarily limited to the units, but may include other units not expressly listed or inherent to such a process, method, product, or device.

Figure 1:
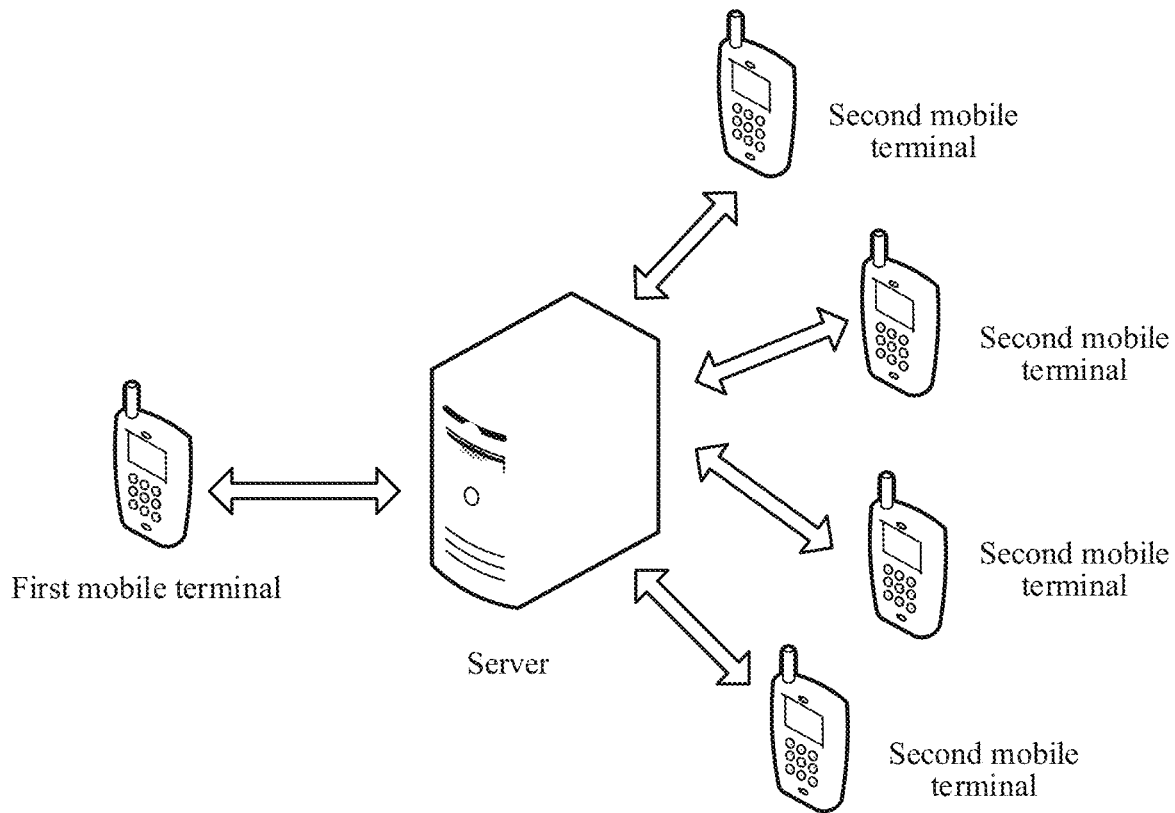
FIG. 1 is a schematic diagram of a system architecture to which an information processing method is applied.

Various embodiments relate to an information processing system. FIG. 1 is a schematic diagram of a system architecture to which an information processing method is applied. The system architecture includes a first mobile terminal, at least one second mobile terminal, and a server. The four second mobile terminals in FIG. 1 are examples. During actual application, there may be more or fewer second mobile terminals.

The first mobile terminal and the second mobile terminal may, additionally or alternatively, include smartphones, tablet computers, personal digital assistants (PDA), or the like. Smartphones are used as an example for descriptions herein, but do not constitute a limitation on solutions of various embodiments. The first mobile terminal is configured to send a value packet, and the at least one second mobile terminal is configured to receive the value packet.

An embodiment designs a value packet triggered based on a chat context. The value packet is an electronic payment envelope. The first mobile terminal may match a key word library according to a chat content received from the second mobile terminal. For example, a key word may be a New Year greeting, various festival blessings (such as happy birthday), or the like that trigger activation of a "payment envelope transmitting entry". In addition, the server may further provide a displayed content corresponding to the value packet. The displayed content may include a plurality of types of implementations, such as texts, letters, or some images of a spliced picture. When using the second mobile terminal, a user not only obtains a value amount of the value packet, but also views a displayed content corresponding to the value amount.

The electronic payment envelope is a service provided by banks and other entities in the field of e-commerce. The electronic payment envelope may use online banking feature, and act as an extension of a card-to-card transfer service.

Figure 2:
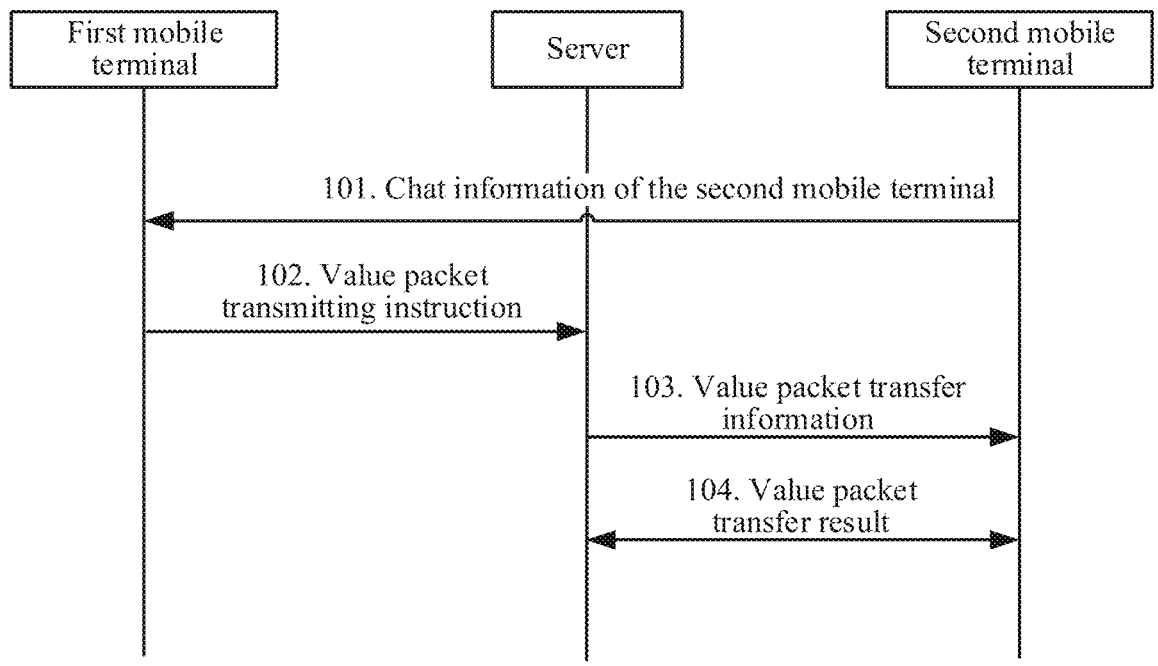
FIG. 2 is a schematic diagram of an interaction process between a server, a first mobile terminal, and a second mobile terminal in an information processing method.

FIG. 2 is a schematic diagram of an interaction process between a server, a first mobile terminal, and a second mobile terminal in an information processing method. The interaction process mainly includes the following procedures.

At Step 101, second mobile terminal transmits chat information to a server, and the server forwards the chat information from the second mobile terminal to a first mobile terminal.

The chat information may be a reply for chat information of the first mobile terminal, or may be chat information actively sent by the second mobile terminal to the first mobile terminal.

At Step 102, the first mobile terminal matches a key word extracted from the chat information with a key word library, and transmits a value packet transmitting instruction to the server after the key word is successfully matched with the key word library.

In this example embodiment, step 101 is an optional step. However, other steps discussed may be optional in other embodiments. When the first mobile terminal extracts the key word from the chat information, the chat information may be transmitted by the second mobile terminal or the first mobile terminal. In FIG. 1, that the second mobile terminal transmits the chat information is used as an example for description.

In some embodiments, the value packet transmitting instruction includes: a total amount of value packets that need to be transferred. In some cases, the value packet transmitting instruction may further include: a quantity of to-be-transferred value packets.

At Step 103, the server transmits value packet transfer information to the second mobile terminal.

The value packet transfer information includes: a value amount determined by the server for the to-be-transferred value packet, and a displayed content determined for the value packet.

At Step 104, the second mobile terminal transmits a value packet transfer result to the server.

The value packet transfer result includes: a value amount of the value packet obtained by the second mobile terminal and a corresponding displayed content.

Through the foregoing manner, when using the first mobile terminal, a user triggers a value packet transfer process through a chat context between the first mobile terminal and the second mobile terminal. In addition, the value packet transfer information transmitted by the server further carries a displayed content determined for the value packet. Therefore, when receiving the value packet by using the second mobile terminal, aside from the value amount of the value packet, the user may further view the displayed content corresponding to the value amount. By triggering value transfer through chat information, a conversion rate of a social product is improved. In addition, a displayed content transmitted by a server may be further displayed through a value packet transfer process, so that value packet transfer is more interesting, and playability of the social product is improved.

The following describes the information processing method of the embodiments from the perspective of the server. The information processing method mainly includes the following procedures: receiving, by a server, a value packet transmitting instruction, the value packet transmitting instruction being transmitted after a key word extracted from chat information by a first mobile terminal is matched with a key word library; and transmitting, by the server, value packet transfer information to a second mobile terminal. Further, the value packet transfer information includes: a value amount determined for to-be-transferred value packet, and a displayed content determined for the value packet. In some embodiments, the method further includes: receiving, by the server, a value packet transfer result transmitted by the second mobile terminal, the value packet transfer result including: a value amount of a value packet obtained by the second mobile terminal and a corresponding displayed content.

Figure 3:
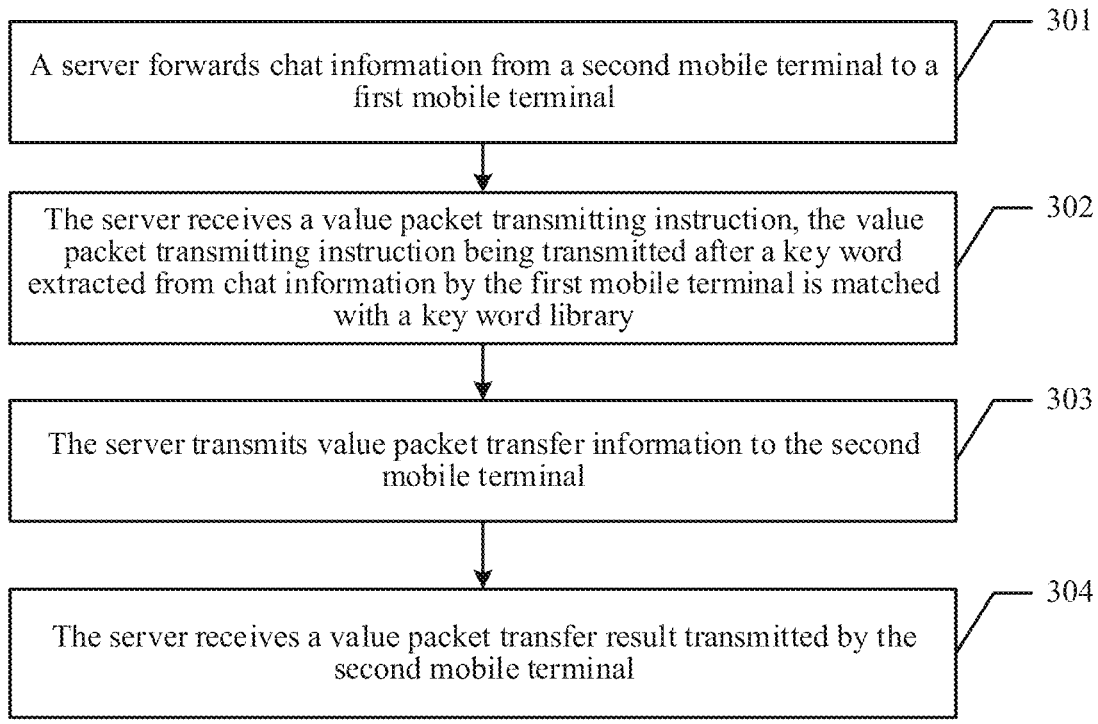
FIG. 3 is a schematic block flowchart of an information processing method.

FIG. 3 is a schematic block flowchart of an information processing method

At 301, a server forwards chat information from a second mobile terminal to a first mobile terminal.

This embodiment is applied to an information processing system, where the information processing system includes a first mobile terminal, at least one second mobile terminal and a server. The first mobile terminal is configured to transmit a value packet, and the at least one second mobile terminal is configured to receive the value packet. In this solution, the value packet is specifically an electronic payment envelope. If there is only one second mobile terminal, the first mobile terminal transmits a one-to-one payment envelope; and if there are a plurality of second mobile terminals, the first mobile terminal transmits a one-to-many payment envelope.

In this embodiment, the first mobile terminal and the second mobile terminal may perform interaction of texts or voice through a chat window. For example, the second mobile terminal may transmit one segment of blessing voice, or blessing texts to the first mobile terminal.

In some cases, the method further includes, before step 301, transmitting, by the server, a value packet transfer activation instruction to the first mobile terminal, the value packet transfer activation instruction including: a key word library.

The server may transmit the value packet transfer activation instruction to the first mobile terminal. The value packet transfer activation instruction may be used for activating a function of value packet transfer, so that the first mobile terminal may trigger value packet transfer. Otherwise, when the value packet transfer activation instruction is not used, the value packet transfer process provided in this embodiment cannot be used. The value packet transfer activation instruction may include a key word library used for activating the value packet transfer process. After receiving the key word library, the first mobile terminal may activate the value packet transfer process.

At 302, the server receives a value packet transmitting instruction, the value packet transmitting instruction being transmitted after a key word extracted from chat information by the first mobile terminal is matched with a key word library.

For example, the value packet transmitting instruction may include: a quantity of value packets and a total amount of value packets that need to be transferred.

In this embodiment, the server forwards the chat information of the second mobile terminal to the first mobile terminal. The first mobile terminal may obtain the chat information of the second mobile terminal, and extract the key word based on the chat information. For example, the first mobile terminal may extract the key word after performing speech recognition, and match the extracted key word with the key word library. Then the first mobile terminal may prompt a user to perform value packet transfer. The value packet transmitting instruction transmitted by the first mobile terminal may include: a quantity of value packets and a total amount of value packets that need to be transferred. The quantity of the value packets and the total amount of the value packets may be configured by the user of the first mobile terminal, or a default quantity of the value packets and a default total amount of the value packets may be used.

In this embodiment, the first mobile terminal may use a plurality of types of value packets. For example, a gold payment envelope may be transmitted. A manner of transmitting another value packet such as cashes, US dollars, game currencies, flowers, or props may alternatively be used. This is not limited herein.

In some cases, the method further includes, before step 302, determining, by the server according to a quantity of the value packets, displayed contents of which a quantity is equal to the quantity of the value packets, from a preset content database, the value packets being in a one-to-one correspondence to the displayed contents.

The server may preset a content database. The content database may be a word-and-sentence library, in which a blessing sentence is randomly matched through the quantity of the value packets. A quantity of displayed contents included in the blessing sentence is equal to the quantity of the value packets. For example, when the quantity of value packets set by the first mobile terminal is 14, the server may provide the following blessing sentence for matching "Enjoy yourself when you are riding high, don't hesitate to enjoy money and time", where each of the 14 words is a displayed content, and each displayed content corresponds to a value amount. When the user uses the second mobile terminal to grab a value amount, one of the 14 words is displayed.

In some embodiments, after the server determines, according to the quantity of the value packets, the displayed contents of which the quantity is equal to the quantity of the value packets, from the preset content database, the information processing method of this embodiment further includes determining, by the server according to the displayed content corresponding to the value packet, a value amount corresponding to the value packet, from a total amount of value packets that need to be transferred, a value amount of a value packet corresponding to a displayed content satisfying a preset condition being greater than a value amount of a value packet corresponding to a displayed content not satisfying the preset condition.

To respectively set value amounts corresponding to the value packets from the total amount of the value packets that need to be transferred, the server may use, for example, a manner of random setting. In addition, to make value packet transfer more interesting, matching may alternatively be performed for the displayed content and the preset condition, where a value amount of a value packet corresponding to the displayed content satisfying the preset condition is greater than a value amount of a value packet corresponding to the displayed content not satisfying the preset condition. For example, in all displayed contents, if a displayed content includes a word in the preset condition, a value amount of a value packet corresponding to the displayed content is largest, and other value amounts are less than the value amount of the value packet corresponding to the displayed content satisfying the preset condition.

At 303, the server transmits value packet transfer information to the second mobile terminal.

The value packet transfer information includes: a value amount determined by the server for the to-be-transferred value packet, and a displayed content determined for the value packet.

In this embodiment, after receiving the value packet transmitting instruction, the server may determine, through the value packet transmitting instruction, a quantity of value packets transmitted by the first mobile terminal and a total amount of value packets that need to be transferred. A value amount determined by the server for the to-be-transferred value packet corresponds to an amount of the value packet. For example, when the value amount is 100, and there is only one second mobile terminal, a received electronic payment envelope is 100. If the value amount is 200, and there are a plurality of second mobile terminals, an electronic payment envelope received by each of the second mobile terminals is a random value less than 200 and greater than 0.

In this embodiment, in addition to or as an alternative to determining the value amount corresponding to the to-be-transferred value packet, the server further needs to determine a displayed content for the value packet, where the displayed content corresponds to the value packet, and in addition, is a content that needs to be simultaneously displayed with the value packet. The displayed content may be determined by the server, or may be transmitted to the server after being determined by the first mobile terminal by using a user-defined manner. The displayed content may include a plurality of types of implementations, such as texts, letters, or some images of a spliced picture. After being associated, the displayed contents corresponding to the value packets may be a complete blessing sentence, or a complete image. The second mobile terminal grabbing the value amount further needs to display, on a terminal interface of the second mobile terminal, the displayed content corresponding to the value packet. For example, the value packet transfer information transmitted by the server includes four value packets. Each value packet corresponds to a word, respectively: "money", "for", "each", and "word". In this case, the four second mobile terminals further separately obtain, aside from grabbing value amounts of the value packets, one word corresponding to the value packet. The words grabbed by the second mobile terminals are displayed in a group chat window, so that it is more interesting for the user to perform value packet transfer through a social product.

At 304, the server receives a value packet transfer result transmitted by the second mobile terminal.

The value packet transfer result includes: a value amount of the value packet obtained by the second mobile terminal and a corresponding displayed content.

In this embodiment, after the server transmits the value packet transfer information to at least one second mobile terminal, all the second mobile terminals may display the value packet transfer information. When tapping a button of grabbing a value packet, the user may obtain a value amount of a value packet and a corresponding displayed content. The second mobile terminal reports the value packet transfer result to the server, and the server stores the value packet transfer result of the second mobile terminal.

For example, in this embodiment, when the first mobile terminal and the second mobile terminal can use a social product to chat, a product conversion rate of the social product, which is used as an entry-type product, is effectively improved. In this embodiment, a text link entry is actively triggered when a special context of a user is recognized in a specific time such as the Spring Festival or the Valentine's Day, to lead the user to transmit a payment envelope. The problem of contextualization operation is effectively resolved. In addition, for a group payment envelope in the related art, payment envelopes received by all people are the same, and only values are different, so that interest is relatively poor. In this embodiment, when a payment envelope is sent, a sentence or a phrase is corresponded according to a quantity of people, and each person receiving a payment envelope may obtain a word, where each word corresponds to a blessing and a value, so that each received payment envelope is distinct This may improve user experience relative to existing market-based solutions.

In some embodiments, after step 304 in which the server receives the value packet transfer result transmitted by the second mobile terminal, the information processing method provided by this embodiment further includes determining, by the server, whether there is a non-transferred value packet after a preset duration. The method may further include transmitting, by the server in a case that there is a non-transferred value packet after the preset duration, a value amount and a displayed content that correspond to the non-transferred value packet to the first mobile terminal.

The server may alternatively set an effective duration of the value packet, and determine whether there is a non-transferred value packet after the preset duration. For a transferred value packet in the duration, a value packet transfer result is recorded. In a case that there is a non-transferred value packet after the preset duration, the server transmits a value amount and a displayed content that correspond to the non-transferred value packet to the first mobile terminal. The first mobile terminal may display the value amount and the displayed content that correspond to the non-transferred value packet to the user.

In this embodiment, the information processing system includes a first mobile terminal, at least one second mobile terminal, and a server. The server first forwards chat information from the second mobile terminal to the first mobile terminal. The server receives a value packet transmitting instruction, the value packet transmitting instruction being transmitted after a key word extracted from chat information by the first mobile terminal is matched with a key word library. The value packet transmitting instruction includes: a quantity of value packets and a total amount of value packets that need to be transferred. The server transmits value packet transfer information to the second mobile terminal. The value packet transfer information includes: a value amount determined by the server for the to-be-transferred value packet, and a displayed content determined for the value packet. The server receives a value packet transfer result transmitted by the second mobile terminal, the value packet transfer result including: a value amount of a value packet obtained by the second mobile terminal and a corresponding displayed content. Through the foregoing manner, when using the first mobile terminal, a user triggers a value packet transfer process through a chat context between the first mobile terminal and the second mobile terminal. In addition, the value packet transfer information transmitted by the server further carries a displayed content determined for the value packet. Therefore, when receiving the value packet by using the second mobile terminal, aside from the value amount of the value packet, the user may further view the displayed content corresponding to the value amount. By triggering value transfer through chat information, a conversion rate of a social product is improved. In addition, a displayed content transmitted by a server may be further displayed through a value packet transfer process, so that value packet transfer is more interesting, and playability of the social product is improved.

The following describes the information processing method of the embodiments from the perspective of the first mobile terminal. The information processing method may include extracting, by a first mobile terminal, a key word from chat information, and matching the key word with a key word library. The information processing method may include transmitting, by the first mobile terminal, a value packet transmitting instruction in a case that the key word is successfully matched. When the first mobile terminal extracts the key word from the chat information, the chat information may be transmitted by the second mobile terminal, or may be transmitted by the first mobile terminal.

In this embodiment, the first mobile terminal may perform matching on the key word when receiving the chat information or when actively transmitting the chat information. That is, the chat information may be received, or may be actively transmitted. In addition, this embodiment may not be limited to the information processing system. An execution body of the method provided by this embodiment may be a common computer device, such as a mobile terminal.

Figure 4:
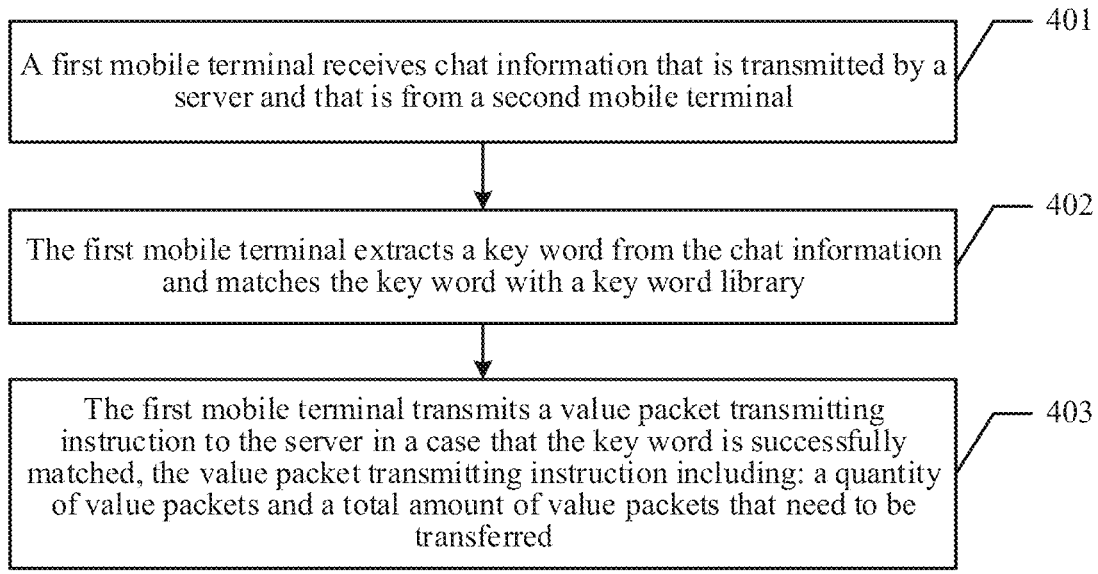
FIG. 4 is a schematic block flowchart of an information processing method.

FIG. 4 is a schematic block flowchart of an information processing method according to an embodiment.

At 401, a first mobile terminal receives chat information that is transmitted by a server and that is from a second mobile terminal.

This embodiment may be applied in an information processing system, where the information processing system includes a first mobile terminal, at least one second mobile terminal and a server. The first mobile terminal is configured to transmit a value packet, and the at least one second mobile terminal is configured to receive the value packet. In this solution, the value packet is specifically an electronic payment envelope. If there is only one second mobile terminal, the first mobile terminal transmits a one-to-one payment envelope; and if there are a plurality of second mobile terminals, the first mobile terminal transmits a one-to-many payment envelope.

In this embodiment, the first mobile terminal and the second mobile terminal may perform interaction of texts or voice through a chat window. For example, the second mobile terminal may transmit one segment of blessing voice communication, or blessing texts (or other voice or text communications possibly including other content) to the first mobile terminal.

402: The first mobile terminal extracts a key word from the chat information, and matches the key word with a key word library.

In this embodiment, the first mobile terminal may obtain the chat information of the second mobile terminal from the server, and extract the key word based on the chat information. For example, the first mobile terminal may extract the key word after performing speech recognition, and match the extracted key word with the key word library. Then the first mobile terminal may prompt a user to perform value packet transfer. For example, the chat information transmitted by the second mobile terminal includes: a key word such as a birthday blessing or a New Year greeting. The first mobile terminal matches the extracted key word with a local key word library of the first mobile terminal. The key word library may include: a key word such as a birthday blessing or a New Year greeting. In this case, the first mobile terminal determines that the key word extracted from the chat information is successfully matched with the key word library.

403: The first mobile terminal transmits a value packet transmitting instruction to the server in a case that the key word is successfully matched, the value packet transmitting instruction including: a quantity of value packets and a total amount of value packets that need to be transferred.

In this embodiment, when the key word is successfully matched, the value packet transmitting instruction transmitted by the first mobile terminal may include: a quantity of value packets and a total amount of value packets that need to be transferred. The quantity of the value packets and the total amount of the value packets may be configured by the user of the first mobile terminal, or a default quantity of the value packets and a default total amount of the value packets may be used.

In this embodiment, the first mobile terminal may use a plurality of types of value packets. For example, a gold payment envelope may be transmitted. A manner of transmitting another value packet such as national currencies, US dollars, game currencies, flowers, or props may alternatively be used.

In some embodiments, when the key word is successfully matched, the information processing method provided in this embodiment further includes displaying, by the first mobile terminal, value packet transfer prompt information in a chat window. The method may then include generating, by the first mobile terminal in response to receiving confirmation information of transferring the value packet, the value packet transmitting instruction according to a quantity of to-be-transferred value packets and a total amount of value packets that need to be transferred.

The first mobile terminal may actively trigger a text link entry when a special context of a user is recognized in a specific time such as the Spring Festival or the Valentine's Day, to lead the user to perform value packet transfer. The first mobile terminal may display value packet transfer prompt information in a chat window, and lead the user to enter, in a value packet transfer interface, a quantity of value packets and a total amount of value packets that need to be transferred. The user may view the value packet transfer prompt information, and may tap to confirm to transfer the value packets. When receiving confirmation information of the user, the first mobile terminal may generate a value packet transmitting instruction according to the quantity of value packets and the total amount of value packets that need to be transferred that are entered by the user, and transmit the value packet transmitting instruction to the server. The server transmits the value packet transmitting instruction to the at least one second mobile terminal.

In some embodiments, the displaying, by the first mobile terminal, value packet transfer prompt information in a chat window includes obtaining, by the first mobile terminal, a quantity of chat objects in the chat window. The method may then include generating, by the first mobile terminal, the value packet transfer prompt information according to the quantity of the chat objects in the chat window, a quantity of value packet prompts in the value packet transfer prompt information being equal to the quantity of the chat objects.

The first mobile terminal may detect whether a one-to-one chat or a one-to-many chat is performed in the chat window.

The first mobile terminal may further display the quantity of value packet prompts to the user. If a one-to-one chat is performed in the chat window, the quantity of value packet prompts may be one. If a one-to-many chat is performed in the chat window, the quantity of value packet prompts may be N.

In some embodiments, the quantity of the to-be-transferred value packets included in the value packet transmitting instruction may be the same as the quantity of value packet prompts.

In a scenario of a group chat, the user needs to enter the quantity of value packets, for example, the quantity of value packets may be manually entered. It is not limited that, in this embodiment, alternatively, the quantity of value packets may be automatically entered according to a quantity of people in the chat.

In some embodiments, after step 403 in which the first mobile terminal transmits the value packet transmitting instruction to the server, the information processing method of this embodiment of application further includes receiving, by the first mobile terminal, a value amount and a displayed content that correspond to a non-transferred value packet and that are transmitted by the server.

The server may alternatively set an effective duration of the value packet, and determine whether there is a non-transferred value packet after the preset duration. For a transferred value packet in the duration, a value packet transfer result is recorded. In a case that there is a non-transferred value packet after the preset duration, the server transmits a value amount and a displayed content that correspond to the non-transferred value packet to the first mobile terminal. The first mobile terminal may display the value amount and the displayed content that correspond to the non-transferred value packet to the user.

In this embodiment, when using the first mobile terminal, a user triggers a value packet transfer process through a chat context between the first mobile terminal and the second mobile terminal. In addition, the value packet transfer information transmitted by the server further carries a displayed content determined for the value packet. Therefore, when receiving the value packet by using the second mobile terminal, aside from the value amount of the value packet, the user may further view the displayed content corresponding to the value amount. By triggering value transfer through chat information, a conversion rate of a social product is improved. In addition, a displayed content transmitted by a server may be further displayed through a value packet transfer process, so that value packet transfer is more interesting, and playability of the social product is improved.

The following describes the information processing method of the embodiments from the perspective of the second mobile terminal. The information processing method may include receiving, by the second mobile terminal, value packet transfer information. The method may include obtaining, by the second mobile terminal, a transfer instruction for transferring a value packet in the value packet transfer information.

In some embodiments, the method further includes displaying, by the second mobile terminal, a value amount and a corresponding displayed content of a value packet determined according to the transfer instruction. The method may then include transmitting, by the second mobile terminal, a value packet transfer result, the value packet transfer result including: a value amount of an obtained value packet and a corresponding displayed content. The value packet transfer information may be transmitted by the server to the second mobile terminal, and the value packet transfer result transmitted by the second mobile terminal may be transmitted to the server.

Figure 5:
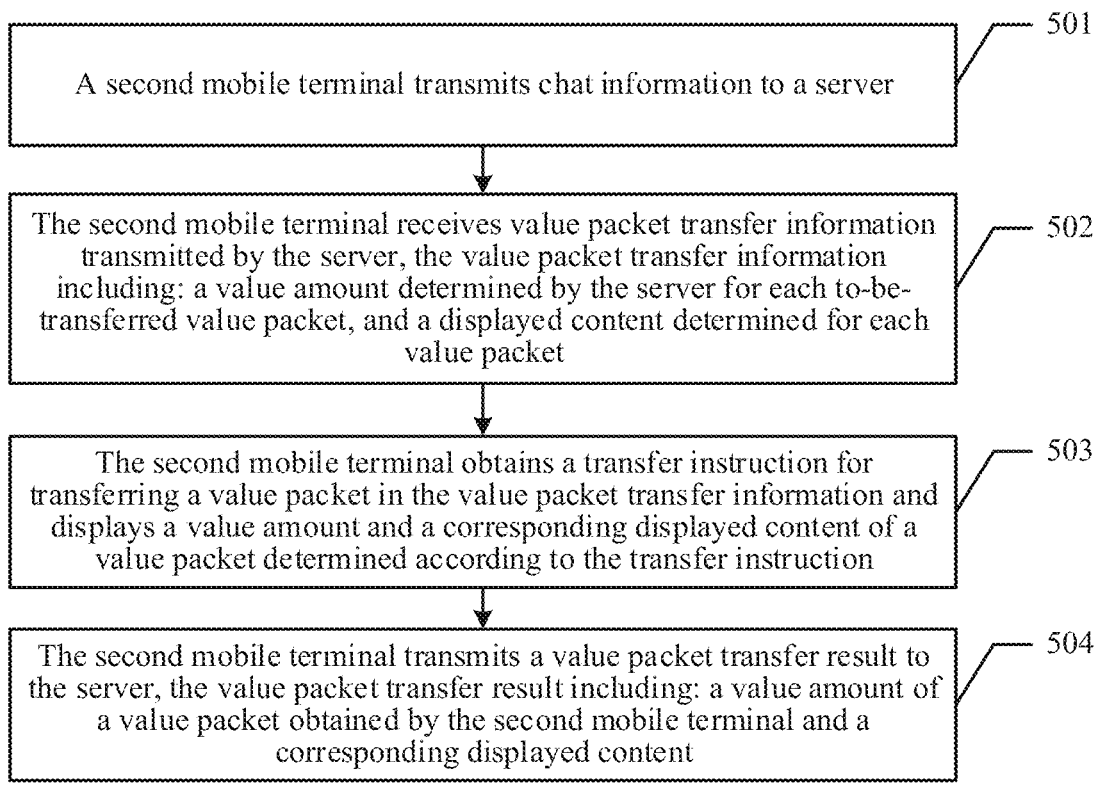
FIG. 5 is a schematic block flowchart of an information processing method.

FIG. 5 is a schematic block flowchart of an information processing method according to an embodiment.

At 501, a second mobile terminal transmits chat information to a server.

This embodiment may be applied in an information processing system, where the information processing system includes a first mobile terminal, at least one second mobile terminal and a server. The first mobile terminal is configured to transmit a value packet, and the at least one second mobile terminal is configured to receive the value packet. In this solution, the value packet is specifically an electronic payment envelope. If there is only one second mobile terminal, the first mobile terminal transmits a one-to-one payment envelope. If there are a plurality of second mobile terminals, the first mobile terminal transmits a one-to-many payment envelope.

In this embodiment, the first mobile terminal and the second mobile terminal may perform interaction of texts or voice through a chat window. For example, the second mobile terminal may transmit one segment of blessing voice commination, or blessing texts (or other voice or text communications possibly including other content) to the first mobile terminal.

At 502, the second mobile terminal receives value packet transfer information transmitted by the server, the value packet transfer information including: a value amount determined by the server for the to-be-transferred value packet, and a displayed content determined for the value packet.

In this embodiment, it can be learned from the foregoing descriptions that, the server may transmit the value packet transfer information to at least one second mobile terminal, and the value packet transfer information includes: a value amount determined by the server for the to-be-transferred value packet, and a displayed content determined for the value packet.

After obtaining the value packet transfer information from the server, the second mobile terminal may display the value packet transfer information in a display interface. The user may trigger a transfer instruction on the display interface of the second mobile terminal. For example, the user taps a payment envelope grabbing button on the display interface.

In some embodiments, step 504 in which a value amount and a corresponding displayed content of a value packet determined according to the transfer instruction are displayed includes determining, by the second mobile terminal, a transmitting time of the transfer instruction. The method may then include obtaining, by the second mobile terminal, a value packet from the value packet transfer information according to the transmitting time of the transfer instruction, and displaying a value amount and a displayed content that correspond to the obtained value packet in a chat window.

In a scenario of a group chat, if a plurality of second mobile terminals perform the value packet transfer process, each second mobile terminal determines a value amount and a displayed content of a corresponding value packet according to a transmitting time of the transfer instruction, and each second mobile terminal may display a value amount and a displayed content that correspond to an obtained value packet in each chat window.

In some embodiments, the displayed content includes at least one of the following contents: texts, letters, or some images of a spliced picture. For example, when the displayed content corresponding to the value packet may be a text, or a letter, or some images of a spliced picture, displayed contents respectively corresponding to the value packets grabbed by all the mobile terminals may be, after being associated, a complete word or a complete spliced picture.

At 503, the second mobile terminal obtains a transfer instruction for transferring a value packet in the value packet transfer information and displays a value amount and a corresponding displayed content of a value packet determined according to the transfer instruction.

The user may transmit a transfer instruction to the second mobile terminal. The transfer instruction is used for transferring a value packet in the value packet transfer information. According to the transfer instruction transmitted by the user, a value amount and a corresponding displayed content of a value packet may be obtained from the value packet transfer information, and in this case, the second mobile terminal may display the value amount and the corresponding displayed content of the value packet determined according to the transfer instruction. For example, when a user taps a payment envelope grabbing button on the display interface, the second mobile terminal may display a grabbed value amount, and simultaneously display a displayed content, where the displayed content may be texts, letters, or some images of a spliced picture.

In some embodiments, step 503 in which the second mobile terminal obtains a transfer instruction for transferring a value packet in the value packet transfer information includes displaying a theme background corresponding to the displayed content. The step may further include detecting the transfer instruction in the theme background.

The second mobile terminal may display a theme background. The theme background corresponds to a displayed content in the value packet transfer information transmitted by the server. Therefore, a theme background corresponding to the displayed content may be displayed on the second mobile terminal, and the user may tap the theme background, so that the second mobile terminal may detect the transfer instruction transmitted by the user. For example, the value packet transfer information transmitted by the server includes a value packet and a displayed content. For example, the displayed content is a word "money", in this case, after receiving the value packet transfer information, the second mobile terminal may display the word "money" in a theme background, so that the user may first intuitively view the displayed content, and the user is led to trigger a transfer instruction.

At 504, the second mobile terminal transmits a value packet transfer result to the server, the value packet transfer result including: a value amount of a value packet obtained by the second mobile terminal and a corresponding displayed content.

In this embodiment, all the second mobile terminals may display the value packet transfer information. When tapping a button of grabbing a value packet, the user may obtain a value amount of a value packet and a corresponding displayed content. The second mobile terminal reports the value packet transfer result to the server, and the server stores the value packet transfer result of the second mobile terminal.

In this embodiment, through the foregoing manner, when using the first mobile terminal, a user triggers a value packet transfer process through a chat context between the first mobile terminal and the second mobile terminal. In addition, the value packet transfer information transmitted by the server further carries a displayed content determined for the value packet. Therefore, when receiving the value packet by using the second mobile terminal, aside from the value amount of the value packet, the user may further view the displayed content corresponding to the value amount. By triggering value transfer through chat information, a conversion rate of a social product is improved. In addition, a displayed content transmitted by a server may be further displayed through a value packet transfer process, so that value packet transfer is more interesting, and usability of the social media platform is improved.

For better understanding and implementation of the foregoing solutions of this embodiment, the following makes a specific description by using a corresponding application scenario as an example.

Next, that the value packet is specifically a gold payment envelope is used as an example for description.

In this embodiment, a text link button of payment envelope re-gifting may be actively triggered when a user context, for example, the user is giving a New Year greeting, is recognized. This runs counter to the conventional wisdom which dictates that each the multiple envelopes be the same. For example, when the user taps a text link of [money for each word], the user enters a payment envelope transmission page. After a quantity of grams of gold (that is, a total amount of gold in transmitted payment envelopes) is entered, and a quantity of people to which payment envelopes are transmitted is selected, there is a sentence or a phrase corresponding to the people. Each person grabbing the payment envelope may grab a word, and the words respectively correspond to different values. In this embodiment, the process flow of the payment envelopes may be performed in a group, or may be performed on an independent receiver. If the process flow of the payment envelopes is performed in a group, a sentence or a phrase is corresponded, and if the process flow of the payment envelopes is performed on an independent receiver, a single word is corresponded.

In this embodiment, when the user is in a specific time such as the Spring Festival or the Valentine's Day and when a special context of a user is recognized, a text link entry is actively triggered by matching a key word with a key word library through neuro-linguistic programming (NLP), to lead the user to transmit a payment envelope. The problem of contextualization operation is effectively resolved. In this embodiment, when a payment envelope is made, a sentence or a phrase is corresponded according to a quantity of people, and each person receiving a payment envelope may obtain a word, where each word corresponds to a blessing and a value, so that each received payment envelope is distinct, and a play method of payment envelopes is more interesting.

Figure 6:
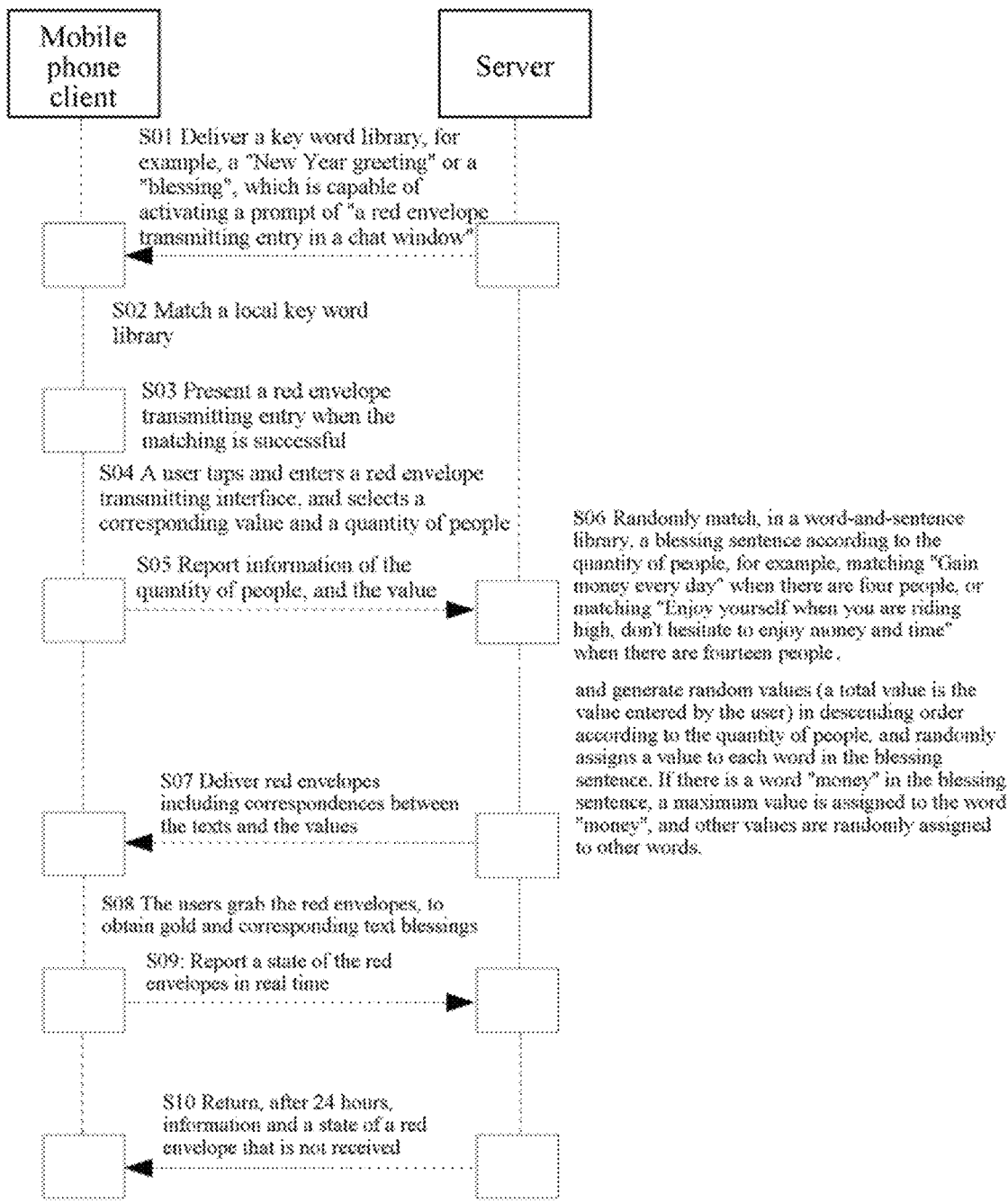
FIG. 6 is a schematic diagram of an interaction scenario of an information processing method.

FIG. 6 is a schematic diagram of an interaction scenario of an information processing method according to an embodiment.

At S01, a server delivers a key word library, for example, a "New Year greeting" or a "blessing", which is capable of activating a prompt of "a payment envelope transmitting entry in a chat window".

At S02, a mobile phone client matches a local key word library.

At S03, The mobile phone client presents a payment envelope transmitting entry when the matching is successful.

At S04, The mobile phone client determines that a user taps and enters a payment envelope transmitting interface, and the user selects a corresponding value and a quantity of people.

The non-English characters and words shown in FIGS. 7a-7e are intended only to demonstrate interface spacing and layout. The content/meaning of the non-English characters and words is not necessary to understand, implement, or describe the techniques and architectures discussed herein.

Figure 7:
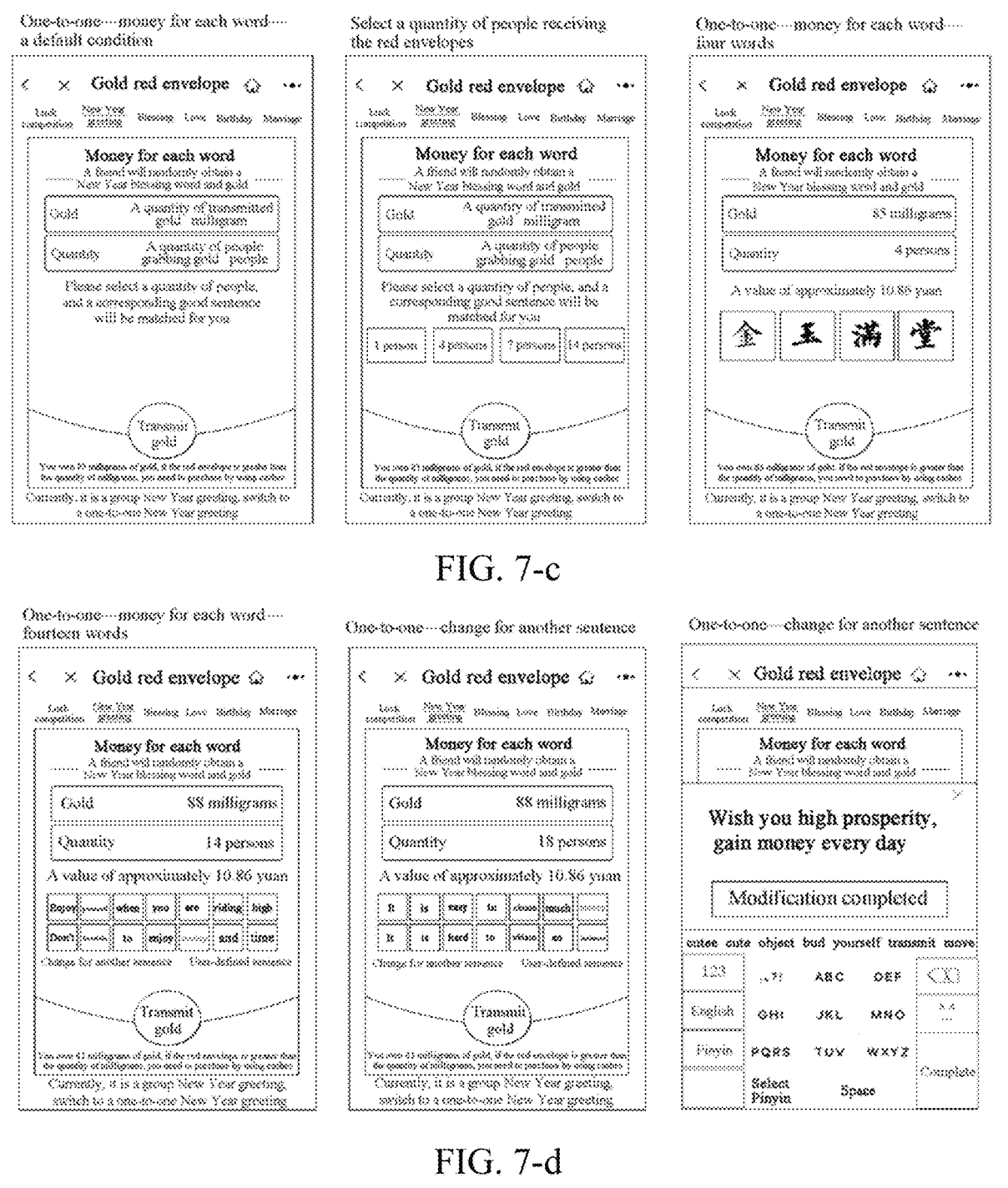

FIG. 7-a is a schematic diagram of triggering a one-to-one payment envelope entry through a key word in a chat context. The user triggers a payment envelope transmitting entry through a key word in a chat context. In a specific time such as the Spring Festival, and in a one-to-one chat window, when it is detected that a chat context of the user is a New Year greeting, through the NLP technology and by performing determining through a key word, for example, a user A transmits "Happy New Year" to a user B during the New Year, a chat context of a New Year greeting may be triggered. In this case, a user (host) who receives the blessing is prompted by a small gray strip of "New way of New Year greetings, gain money for each word you obtain". The user taps a text link of [money for each word], and then enters a process of transmitting a one-to-one payment envelope. The small gray strip is for the user who receives the blessing. For example, A transmits "Happy New Year" to B, and B receives a prompt of the small gray strip.

FIG. 7-b is a schematic diagram of triggering a one-to-many payment envelope entry through a key word in a chat context according to an embodiment. In a specific time such as the Spring Festival, and in a one-to-many chat window, when it is detected that a chat context of users in a group is a New Year greeting, a user (host) who receives the blessing is prompted by a small gray strip of "New way of New Year greetings, gain money for each word you obtain". The user taps a text link of [money for each word], and then enters a process of transmitting a group payment envelope.

FIG. 7-c is a schematic diagram of an interface, which is configured by a user transmitting a payment envelope, for transmitting a payment envelope according to an embodiment. When a user transmitting the payment envelope selects people, a phrase or a sentence corresponding to the people is automatically matched. After the user enters a quantity of grams of gold, by tapping an arrow after "Quantity", a floating layer may pop up for the user to select a quantity of people to which a payment envelope is transmitted, or the user manually enters, by using a keyboard, the quantity of people to which a payment envelope is transmitted, where an upper limit is 100 people. In this embodiment, a balance of gold in a gold account is deducted. If the balance of gold in the gold account is insufficient, the user is prompted to purchase a shortage part.

FIG. 7-d is a schematic diagram of a window in which a user transmitting a payment envelope modifies a text content in a displayed content according to an embodiment. When the user selects to transmit a red envelop to four people, or manually enters a quantity of four to which the red envelop is transmitted, a blessing sentence of four words occurs. When the user switches to another quantity of people, the blessing sentence changes. The blessing sentence is randomly selected from blessing sentences of which quantities of words match the quantity of people. If the quantity of people is greater than a quantity of words of a longest blessing sentence in a blessing sentence library, selection is randomly performed in blessing sentences of which quantities of words are largest.

The user may alternatively tap a button of [change], to change a batch of blessing sentences. Alternatively, the user may tap a button of [user-defined sentence], to manually enter a blessing sentence. In some cases, a maximum word limit may be enforced, for example 14 words. Other maximums may be used.

At S05, the mobile phone client reports information of the quantity of people, and the value.

At S06, the server randomly matches, in a word-and-sentence library, a blessing sentence according to the quantity of people, for example, matching "Gain money every day" when there are four people, or matching "Enjoy yourself when you are riding high, don't hesitate to enjoy money and time" when there are fourteen people, and generates random values (a total value is the value entered by the user) in descending order according to the quantity of people, and randomly assigns a value to each word in the blessing sentence. If there is a word "money" in the blessing sentence, a maximum value is assigned to the word "money", and other values are randomly assigned to other words.

At S07, the server delivers payment envelopes including correspondences between the texts and the values.

At S08, the users grab the payment envelopes, to obtain gold and corresponding text blessings.

FIG. 7-e is a schematic diagram of an interface for receiving a payment envelope according to an embodiment. The payment envelopes received by people in the group are different from each other. When the payment envelopes are transmitted to the group, when friends tap, open, and receive the payment envelopes, the friends may view the blessing sentence of the payment envelope in a current chat window. A quantity of people who receive the payment envelopes may be guessed and obtained. When [Open] is tapped to open the payment envelope, one word of the sentence is received according to a chronological order of receiving, where a value of the payment envelope is random.

At S09, the mobile phone client reports, in real time, a state of grabbing the payment envelopes.

At S10, the server returns, after 24 hours, information and a state of a payment envelope that is not received.

In this embodiment, a manner of transmitting a gold payment envelope is used as an example. Another manner such as transmitting cashes, US dollars, Q coins, game currencies, flowers, props, or the like may alternatively be used. The group or the personal scenario may be replaced with another scenario such as a microblog, a discussion group, a forum, a community, or a post bar.

In this embodiment, for the payment envelope, aside from there is a fixed entry to transmit the payment envelope, different payment envelope entries may alternatively be triggered through a chat context. For a group payment envelope, payment envelopes received by people may be different, and aside from texts, the payment envelope may alternatively be a corner of a spliced picture, a letter of an English word, or the like. For a payment envelope transmitted to a plurality of receivers, the texts are not independent, and instead, the texts compose a meaningful sentence. In addition, in this embodiment, transmitting and receiving of the payment envelope are performed through a social-relationship chain. In this way, the play method of the payment envelope improves the conversion rate of the social platform.

The foregoing method embodiments are expressed as a series of action combinations for the purpose of brief description, but it is to be learned by a person skilled in the art that because some steps may be performed in other sequences or simultaneously according to the embodiments, the embodiments are not limited to a described action sequence. In addition, it is to be also learned by a person skilled in the art that the embodiments described in this specification are all preferred embodiments; and therefore, an action and a module involved are not necessarily mandatory in the embodiments.

For the convenience of a better implementation of the foregoing solutions of the embodiments, the following further provides related apparatuses configured to implement the foregoing solutions.

FIG. 8 is a schematic structural diagram of a server according to an embodiment. Referring to FIG. 8, an embodiment provides a server 600. The server is applied to an information processing system. The information processing system includes a first mobile terminal, at least one second mobile terminal, and the server. The server includes one or more processors, and one or more memories storing a program unit, the program unit being executed by the processor, and the program unit including: a transmitting module 601 and a receiving module 602. The receiving module 602 is configured to receive a value packet transmitting instruction, the value packet transmitting instruction being transmitted after a key word extracted from chat information by a first mobile terminal is matched with a key word library. The transmitting module 601 is configured to transmit value packet transfer information to the second mobile terminal.

In some embodiments, the transmitting module 601 is configured to forward chat information from the second mobile terminal to the first mobile terminal. The receiving module 602 is configured to receive a value packet transmitting instruction, the value packet transmitting instruction being transmitted after a key word extracted from chat information by the first mobile terminal is matched with a key word library, and the value packet transmitting instruction including: a quantity of value packets and a total amount of value packets that need to be transferred. The transmitting module 601 is further configured to transmit value packet transfer information to the second mobile terminal, the value packet transfer information including: a value amount determined by the server for the to-be-transferred value packet, and a displayed content determined for the value packet. The receiving module 602 is further configured to receive a value packet transfer result transmitted by the second mobile terminal, the value packet transfer result including: a value amount of a value packet obtained by the second mobile terminal and a corresponding displayed content.

In some embodiments, the transmitting module 601 is configured to transmit a value packet transfer activation instruction to the first mobile terminal before the receiving module receives the value packet transmitting instruction, the value packet transfer activation instruction including: the key word library.

In some embodiments, the program unit further includes: a processing module 603, the processing module 603 being further configured to determine, according to a quantity of value packets, displayed contents of which a quantity is equal to the quantity of the value packets, from a preset content database before the transmitting module 601 transmits the value packet transfer information to the second mobile terminal, the value packets being in a one-to-one correspondence to the displayed contents.

In some embodiments, the processing module 603 is further configured to determine, according to the displayed content corresponding to the value packet, a value amount corresponding to the value packet, from a total amount of value packets that need to be transferred after determining, according to the quantity of the value packets, the displayed contents of which the quantity is equal to the quantity of the value packets, from the preset content database, a value amount of a value packet corresponding to a displayed content satisfying a preset condition being greater than a value amount of a value packet corresponding to a displayed content not satisfying the preset condition.

In some embodiments, the processing module 603 is further configured to determine, after the receiving module receives the value packet transfer result transmitted by the second mobile terminal, whether there is a non-transferred value packet after a preset duration. The transmitting module 601 is further configured to transmit, in a case that there is a non-transferred value packet after a preset duration, a value amount and a displayed content that correspond to the non-transferred value packet to the first mobile terminal.

Figure 9:
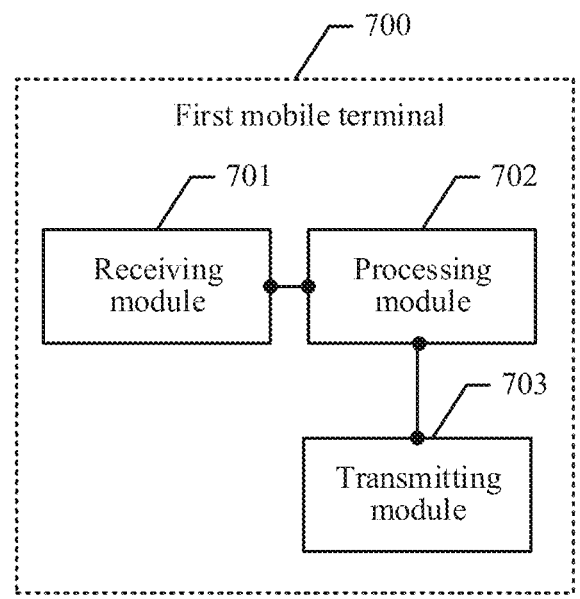
FIG. 9 is a schematic structural diagram of a first mobile terminal.

An embodiment further provides a mobile terminal. FIG. 9 is a schematic structural diagram of a first mobile terminal according to an embodiment. As shown in FIG. 9, the mobile terminal is specifically a first mobile terminal 700. The first mobile terminal 700 is applied to an information processing system. The information processing system includes the first mobile terminal 700, at least one second mobile terminal, and a server. The first mobile terminal 700 includes one or more processors, and one or more memories storing a program unit, the program unit being executed by the processor. The program unit may include a processing module 702, configured to extract a key word from chat information; and match the key word with a key word library. The program unit may include a transmitting module 703, configured to transmit a value packet transmitting instruction in a case that the key word is successfully matched.

In some embodiments, the receiving module 701 is configured to receive chat information that is transmitted by the server and that is from the second mobile terminal. The processing module 702 is configured to extract a key word from the chat information and match the key word with a key word library. The transmitting module 703 is configured to transmit a value packet transmitting instruction to the server in a case that the key word is successfully matched, the value packet transmitting instruction including: a quantity of value packets and a total amount of value packets that need to be transferred.

In some embodiments, the processing module 702 is further configured to display value packet transfer prompt information in a chat window in a case that the key word is successfully matched, and generate, in response to receiving confirmation information of transferring the value packet, the value packet transmitting instruction according to a quantity of to-be-transferred value packets and a total amount of value packets that need to be transferred.

In some embodiments, the processing module 702 is specifically configured to obtain a quantity of chat objects in the chat window; and generate the value packet transfer prompt information according to the quantity of the chat objects in the chat window, a quantity of value packet prompts in the value packet transfer prompt information being equal to the quantity of the chat objects.

In some embodiments, the quantity of the to-be-transferred value packets is equal to the quantity of the value packet prompts.

In some embodiments, the receiving module 701 is further configured to receive, after the transmitting module transmits the value packet transmitting instruction to the server, a value amount and a displayed content that correspond to the non-transferred value packet and that are transmitted by the server.

An embodiment further provides a mobile terminal. The mobile terminal is specifically a second mobile terminal.

Figure 10:
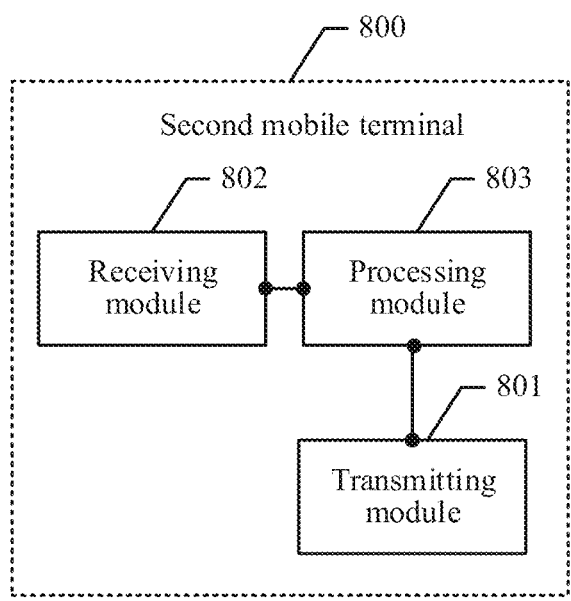
FIG. 10 is a schematic structural diagram of a second mobile terminal.

FIG. 10 is a schematic structural diagram of a second mobile terminal according to an embodiment. As shown in FIG. 10, a second mobile terminal 800 is applied to an information processing system. The information processing system includes a first mobile terminal, at least one second mobile terminal 800, and a server. The second mobile terminal includes one or more processors, and one or more memories storing a program unit, the program unit being executed by the processor. The program unit may include a receiving module 802, configured to receive value packet transfer information, the value packet transfer information being transmitted by a server after a value packet transmitting instruction is received, and the value packet transmitting instruction being transmitted after a key word extracted from chat information by a first mobile terminal is matched with a key word library. The program unit may include a processing module 803, configured to obtain a transfer instruction for transferring a value packet in the value packet transfer information.

In some embodiments, the transmitting module 801 is configured to transmit chat information to the server. The receiving module 802 is configured to receive value packet transfer information transmitted by the server, the value packet transfer information including: a value amount determined by the server for the to-be-transferred value packets, and a displayed content determined for the value packets. The processing module 803 is configured to obtain a transfer instruction for transferring a value packet in the value packet transfer information and display a value amount and a corresponding displayed content of a value packet determined according to the transfer instruction. The transmitting module 801 is further configured to transmit a value packet transfer result to the server, the value packet transfer result including: the value amount and the corresponding displayed content of the value packet obtained by the second mobile terminal.

In some embodiments, the processing module 803 is further configured to determine a transmitting time of the transfer instruction; and obtain a value packet from the value packet transfer information according to the transmitting time of the transfer instruction, and display a value amount and a displayed content that correspond to the obtained value packet in a chat window.

In some embodiments, the displayed content includes at least one of the following contents: texts, letters, or some images of a spliced picture.

In some embodiments, the processing module 803 is further configured to display a theme background corresponding to the displayed content; and detect the transfer instruction in the theme background.

Figure 11:
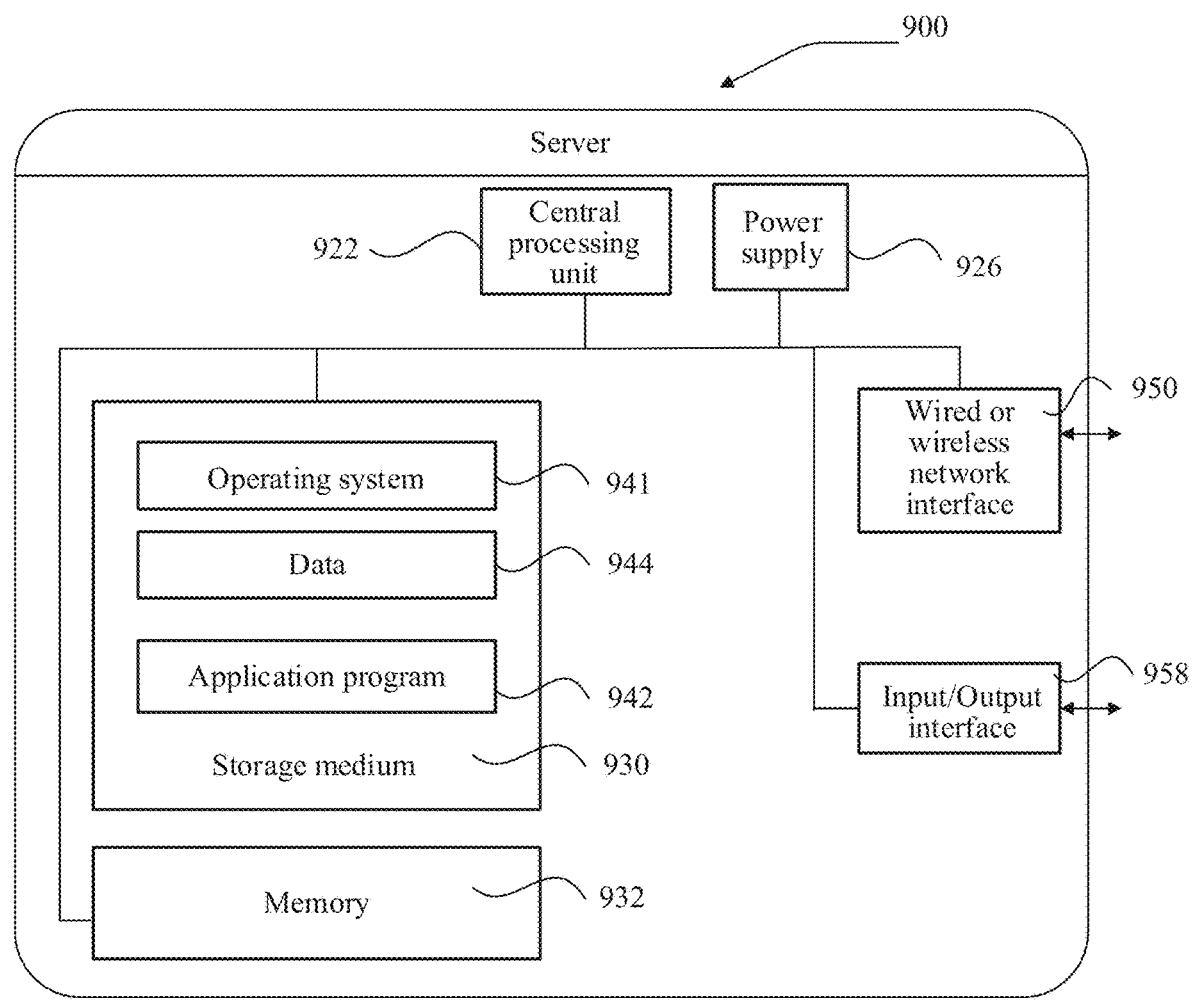
FIG. 11 is a schematic structural diagram of a server.

FIG. 11 is a schematic structural diagram of a server according to an embodiment. The server 900 may vary greatly due to different configurations or performance, and may include one or more central processing units (CPU) 922 (for example, one or more processors) and a memory 932, and one or more storage media 930 (for example, one or more mass storage devices) that store application programs 942 or data 944. The memory 932 and the storage medium 930 may provide transitory storage or persistent storage. The program stored in the storage medium 930 may include one or more modules (not marked in the figure), and each module may include a series of instruction operations to the server. Further, the central processing unit 922 may be configured to communicate with the storage medium 930, and execute, on the server 900, the series of instruction operations stored in the storage medium 930.

The server 900 may further include one or more power supplies 926, one or more wired or wireless network interfaces 950, one or more input/output interfaces 958, and/or one or more operating systems 941 such as Windows Server™, Mac OS X™, Unix™, Linux™, and FreeBSD™.

The steps performed by the server in the foregoing embodiment may be based on the server structure shown in FIG. 11.

The CPU 922 is configured to perform the steps of the information processing method performed by the foregoing server.

Figure 12:
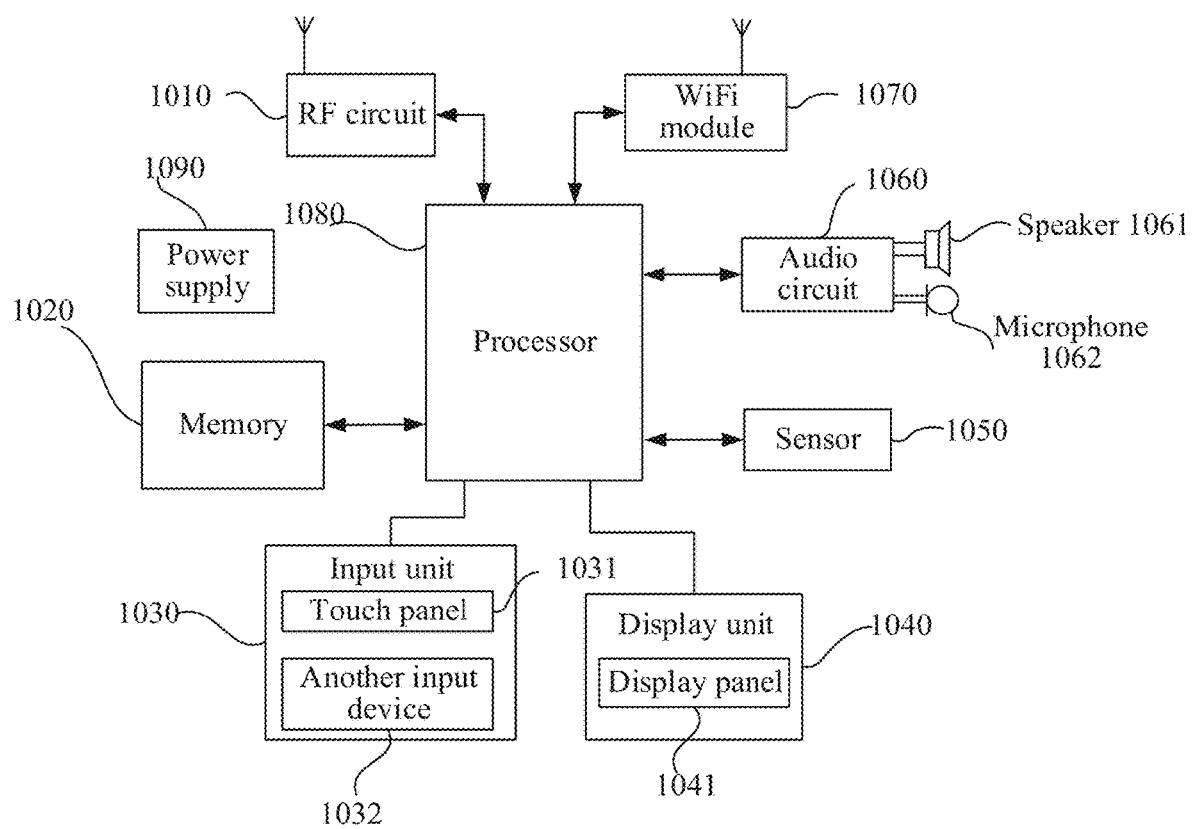
FIG. 12 is a schematic structural diagram of a first mobile terminal.

An embodiment further provides another type of first mobile terminal. As shown in FIG. 12, for ease of description, only parts related to the embodiments are shown. For specific technical details that are not disclosed, refer to the method part of the embodiments. The terminal may be any terminal device such as a mobile phone, a tablet computer, a personal digital assistant (PDA), a point of sales (POS), or an in-vehicle computer, and the terminal being a mobile phone is used as an example.

FIG. 12 is a schematic structural diagram of a first mobile terminal according to an embodiment. The first mobile terminal may be a mobile phone. Referring to FIG. 12, the mobile phone includes components such as: a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the structure of the mobile phone shown in FIG. 12 does not constitute a limitation on the mobile phone, and the mobile phone may include more components or fewer components than those shown in the figure, or some components may be combined, or a different component deployment may be used.

The components of the mobile phone are described in detail below with reference to FIG. 12.

The RF circuit 1010 may be configured to receive and send signals in an information receiving and transmitting process or a call process. Specifically, the RF circuit 1010 receives downlink information from a base station, then delivers the downlink information to the processor 1080 for processing, and sends designed uplink data to the base station. Generally, the RF circuit 1010 includes, but is not limited to, an antenna, at least one amplifier, a transceiver, a coupler, a low noise amplifier (LNA), a duplexer, and the like. In addition, the RF circuit 1010 may also communicate with a network and another device through wireless communication. The wireless communication may use any communications standard or protocol, including, but not limited to a global system of mobile communication (GSM), a general packet radio service (GPRS), code division multiple access (CDMA), wideband code division multiple access (WCDMA), Long Term Evolution (LTE), an email, a short messaging service (SMS), and the like.

The memory 1020 may be configured to store a software program and module. The processor 1080 runs the software program and module stored in the memory 1020, to implement various functional applications of the mobile phone and data processing. The memory 1020 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1020 may include a high speed random access memory, and may also include a non-volatile memory, such as at least one magnetic disk storage device, a flash memory, or another volatile solid-state storage device.

The input unit 1030 may be configured to receive inputted numerical or character information, and generate a key signal input related to the user setting and function control of the mobile phone. Specifically, the input unit 1030 may include a touch panel 1031 and another input device 1032. The touch panel 1031, also referred to as a touchscreen, may collect a touch operation performed by the user on or near the touch panel (such as an operation performed by a user on the touch panel 1031 or near the touch panel 1031 by using any proper object or accessory, such as a finger or a stylus), and drive a corresponding connecting apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1080. Moreover, the touch controller can receive and execute a command sent from the processor 1080. In addition, the touch panel 1031 may be a resistive, capacitive, infrared, or surface sound wave type touch panel. In addition to the touch panel 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information entered by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although in FIG. 12, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1060, a speaker 1061, and a microphone 1062 may provide audio interfaces between the user and the mobile phone. The audio circuit 1060 may convert received audio data into an electrical signal and transmit the electrical signal to the speaker 1061. The speaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Then, the processor 1080 sends the audio data to, for example, another mobile phone by using the RF circuit 1010, or outputs the audio data to the memory 1020 for further processing.

WiFi is a short distance wireless transmission technology. The mobile phone may help, by using the WiFi module 1070, a user to receive and send an email, browse a web page, access stream media, and the like. This provides wireless broadband Internet access for the user. Although FIG. 12 shows the WiFi module 1070, it may be understood that the WiFi module 1070 is not a necessary component of the mobile phone, and the WiFi module 1070 may be omitted as required provided that the scope of the essence of the present disclosure is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor 1080 executes various functions of the mobile phone and performs data processing, thereby monitoring the entire mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem may alternatively not be integrated into the processor 1080.

The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment, specific steps performed by the processor 1080 included in the terminal are the information processing method performed by the foregoing first mobile terminal.

Figure 13:
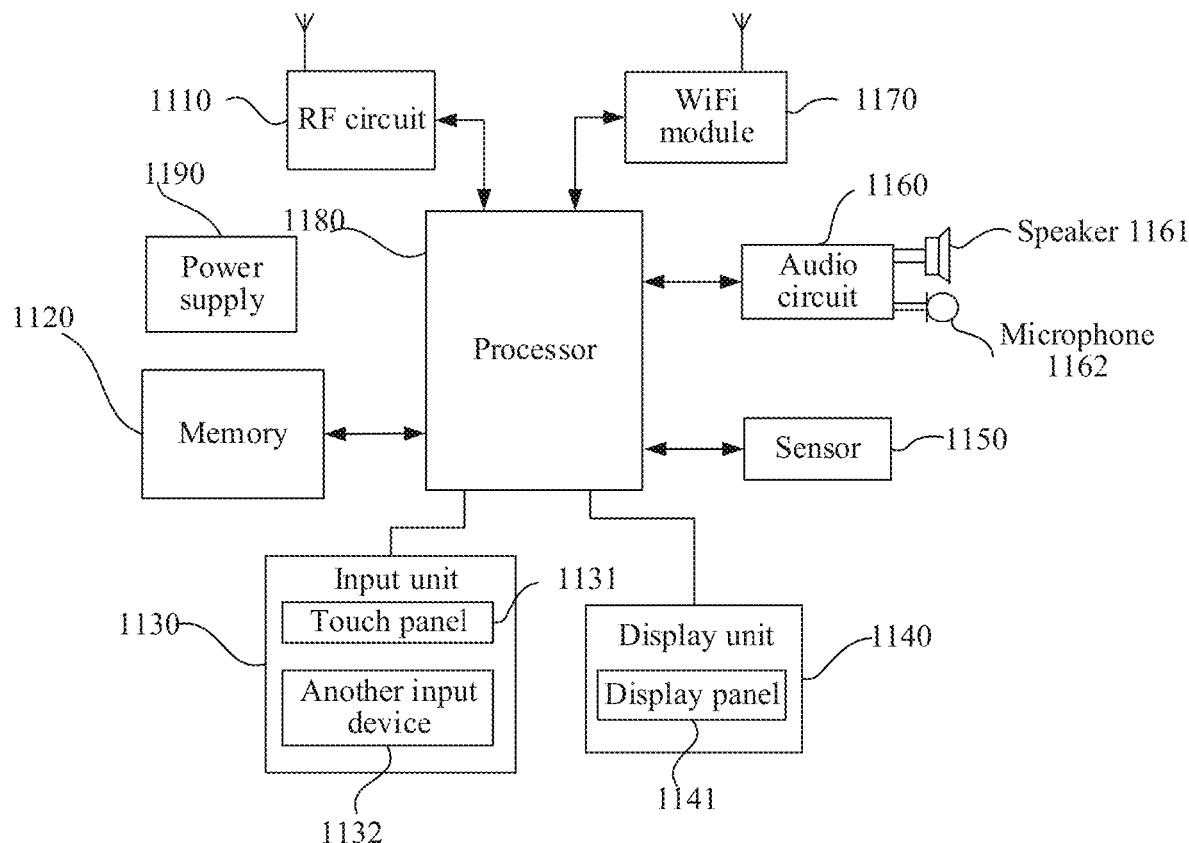
FIG. 13 is a schematic structural diagram of a second mobile terminal.

An embodiment further provides another type of second mobile terminal. As shown in FIG. 13, for ease of description, only parts related to the embodiments are shown. For specific technical details that are not disclosed, refer to the method part of the embodiments. The terminal may be any terminal device such as a mobile phone, a tablet computer, a personal digital assistant (PDA), a point of sales (POS), or an in-vehicle computer, and the terminal being a mobile phone is used as an example.

FIG. 13 is a schematic structural diagram of a second mobile terminal according to an embodiment. The second mobile terminal may be a mobile phone. Referring to FIG. 13, the mobile phone includes components such as: an RF circuit 1110, a memory 1120, an input unit 1130, a display unit 1140, a sensor 1150, an audio circuit 1160, a WiFi module 1170, a processor 1180, and a power supply 1190. A person skilled in the art may understand that the structure of the mobile phone shown in FIG. 13 does not constitute a limitation on the mobile phone, and the mobile phone may include more components or fewer components than those shown in the figure, or some components may be combined, or a different component deployment may be used.

The components of the mobile phone are described in detail below with reference to FIG. 13.

The RF circuit 1110 may be configured to receive and send signals in an information receiving and transmitting process or a call process. Specifically, the RF circuit 1110 receives downlink information from a base station, then delivers the downlink information to the processor 1180 for processing, and sends designed uplink data to the base station. Generally, the RF circuit 1110 includes, but is not limited to, an antenna, at least one amplifier, a transceiver, a coupler, a low noise amplifier (LNA), a duplexer, and the like. In addition, the RF circuit 1110 may also communicate with a network and another device through wireless communication. The wireless communication may use any communications standard or protocol, including, but not limited to a global system of mobile communication (GSM), a general packet radio service (GPRS), code division multiple access (CDMA), wideband code division multiple access (WCDMA), Long Term Evolution (LTE), an email, a short messaging service (SMS), and the like.

The memory 1120 may be configured to store a software program and module. The processor 1180 runs the software program and module stored in the memory 1120, to implement various functional applications of the mobile phone and data processing. The memory 1120 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1120 may include a high speed random access memory, and may also include a non-volatile memory, such as at least one magnetic disk storage device, a flash memory, or another volatile solid-state storage device.

The input unit 1130 may be configured to receive inputted numerical or character information, and generate a key signal input related to the user setting and function control of the mobile phone. Specifically, the input unit 1130 may include a touch panel 1131 and another input device 1132. The touch panel 1131, also referred to as a touchscreen, may collect a touch operation performed by the user on or near the touch panel (such as an operation performed by a user on the touch panel 1131 or near the touch panel 1131 by using any proper object or accessory, such as a finger or a stylus), and drive a corresponding connecting apparatus according to a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1180. Moreover, the touch controller can receive and execute a command sent from the processor 1180. In addition, the touch panel 1131 may be implemented by using various types, such as a resistive type, a capacitance type, an infrared type, and a surface acoustic wave type. The input unit 1130 may include other input devices 1132 in addition to the touch panel 1131. Specifically, the another input device 1132 may include, but is not limited to, one or more of a physical keyboard, a functional key (such as a volume control key or a switch key), a track ball, a mouse, and a joystick.

The display unit 1140 may be configured to display information entered by the user or information provided for the user, and various menus of the mobile phone. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1031 transfers the touch operation to the processor 1180, to determine a type of a touch event. Then, the processor 1180 provides a corresponding visual output on the display panel 1141 according to the type of the touch event. Although in FIG. 13, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150, for example, a light sensor, a motion sensor, and other sensors. Specifically, the light sensor may include an ambient light sensor and a proximity sensor. The ambient light sensor may adjust luminance of the display panel 1141 according to brightness of ambient light, and the proximity sensor may turn off the display panel 1141 and/or backlight when the mobile phone moves to an ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1160, a loudspeaker 1161, and a microphone 1162 may provide audio interfaces between a user and the mobile phone. The audio circuit 1160 may convert received audio data into an electrical signal and transmit the electrical signal to the speaker 1161. The speaker 1161 converts the electrical signal into a sound signal for output. On the other hand, the microphone 1162 converts a collected sound signal into an electrical signal. The audio circuit 1160 receives the electrical signal, converts the electrical signal into audio data, and outputs the audio data to the processor 1180 for processing. Then, the processor transmits the audio data to, for example, another mobile phone by using the RF circuit 1110, or outputs the audio data to the memory 1120 for further processing.

WiFi is a short distance wireless transmission technology. The mobile phone may help, by using the WiFi module 1170, a user to receive and send an email, browse a web page, access stream media, and the like. This provides wireless broadband Internet access for the user. Although FIG. 13 shows the WiFi module 1170, it may be understood that the WiFi module 1170 is not a necessary component of the mobile phone, and the WiFi module 1070 may be omitted as required provided that the scope of the essence of the present disclosure is not changed.

As a control center of the mobile phone, the processor 1180 is connected to all parts of the entire mobile phone by using various interfaces and lines, and performs various functions and data processing of the mobile phone by running or executing the software program and/or module stored in the memory 1120 and invoking the data stored in the memory 1120, so as to perform overall monitoring on the mobile phone. Optionally, the processor 1180 may include one or more processing units. Preferably, the processor 1180 may integrate an application processor and a modem processor. The application processor mainly processes an operating system, a user interface, an application program, and the like. The modem processor mainly processes wireless communication. It may be understood that the foregoing modem may alternatively not be integrated into the processor 1180.

The mobile phone further includes the power supply 1190 (such as a battery) for supplying power to the components. Preferably, the power supply may be logically connected to the processor 1180 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment, specific steps performed by the processor 1180 included in the terminal are the information processing method performed by the foregoing second mobile terminal.

Figure 14:
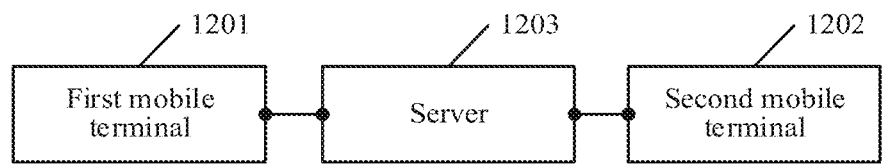
FIG. 14 is a schematic diagram of an embodiment of an information processing system.

FIG. 14 is a schematic diagram of an embodiment of an information processing system according to an embodiment. The information processing system includes a first mobile terminal 1201, at least one second mobile terminal 1202, and a server 1203.

The second mobile terminal 1202 transmits chat information to the server 1203, and the server 1203 forwards the chat information from the second mobile terminal 1202 to the first mobile terminal 1201.

The chat information may be a reply for chat information of the first mobile terminal 1201, or may be chat information actively sent by the second mobile terminal 1202 to the first mobile terminal 1201.

The first mobile terminal 1201 matches a key word extracted from the chat information with a key word library, and transmits a value packet transmitting instruction to the server 1203 after the key word is successfully matched with the key word library, the value packet transmitting instruction including: a quantity of value packets and a total amount of value packets that need to be transferred.

The server 1203 transmits value packet transfer information to the second mobile terminal 1202. The value packet transfer information includes: a value amount determined by the server 1203 for the to-be-transferred value packet, and a displayed content determined for the value packet.

The second mobile terminal 1202 transmits a value packet transfer result to the server 1203, the value packet transfer result including: a value amount of a value packet obtained by the second mobile terminal 1202 and a corresponding displayed content.

In this embodiment, the information processing system includes a first mobile terminal, at least one second mobile terminal, and a server. The server first forwards chat information from the second mobile terminal to the first mobile terminal. The server receives a value packet transmitting instruction, the value packet transmitting instruction being transmitted after a key word extracted from chat information by the first mobile terminal is matched with a key word library. The value packet transmitting instruction includes: a quantity of value packets and a total amount of value packets that need to be transferred. The server transmits value packet transfer information to the second mobile terminal. The value packet transfer information includes: a value amount determined by the server for the to-be-transferred value packet, and a displayed content determined for the value packet. The server receives a value packet transfer result transmitted by the second mobile terminal, the value packet transfer result including: a value amount of a value packet obtained by the second mobile terminal and a corresponding displayed content. Through the foregoing manner, when using the first mobile terminal, a user triggers a value packet transfer process through a chat context between the first mobile terminal and the second mobile terminal. In addition, the value packet transfer information transmitted by the server further carries a displayed content determined for the value packet. Therefore, when receiving the value packet by using the second mobile terminal, aside from the value amount of the value packet, the user may further view the displayed content corresponding to the value amount. By triggering value transfer through chat information, a conversion rate of a social product is improved. In addition, a displayed content transmitted by a server may be further displayed through a value packet transfer process, so that value packet transfer is more interesting, and playability of the social product is improved.

In addition, the described apparatus embodiment illustrative examples. The units described as separate parts may or may not be physically separated, and parts displayed as units may or may not be physical units, may be located in one position, or may be distributed on a plurality of network units. Some or all modules thereof may be selected based on an actual requirement, to achieve an objective of the solution in this embodiment. In addition, in the accompanying drawings of the apparatus embodiments provided in this application, connection relationships between modules indicate that the modules have communication connections with each other, and the communication connections may be specifically implemented as one or more communications buses or signal cables. A person of ordinary skill in the art may understand and implement the objective without creative efforts.

Based on the description of the foregoing implementations, a person skilled in the art may clearly understand that the embodiments may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. Based on such an understanding, the technical solutions of the embodiments essentially or the part contributing to the related art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments. The units and/or modules discussed herein may be implement on hardware circuitry.

The foregoing embodiments are intended for describing the technical solutions of the embodiments, but not for limiting this application. Although this application is described in detail with reference to the foregoing embodiments, it is to be understood by a person of ordinary skill in the art that they may still make modifications to the example technical solutions described in the foregoing embodiments or make equivalent replacements to some technical features thereof, without departing from the spirit and scope of the technical solutions of the embodiments.

In the embodiments, a value packet transmitting instruction is received, the value packet transmitting instruction being transmitted after a key word extracted from chat information by a first mobile terminal is matched with a key word library; and value packet transfer information is transmitted to a second mobile terminal. Through the foregoing manner, when using the first mobile terminal, a user triggers a value packet transfer process through a chat context between the first mobile terminal and the second mobile terminal. By triggering value transfer through chat information, a conversion rate of a social product is improved, and usability of the social media platform is improved.

What is claimed is:

1. An information processing method, comprising:
   transmitting, by a server, a value packet transfer activation instruction to a first mobile terminal, the value packet transfer activation instruction comprising a key word library;
   transmitting, by the server, chat information from a second mobile terminal to the first mobile terminal;
   receiving, by a server, the value packet transmitting instruction from the first mobile terminal, wherein the value packet transmitting instruction is transmitted after a key word extracted from chat information by the first mobile terminal being matched with the key word library and the value packet transmitting instruction includes a quantity of value packets and total amount of value packets that need to be transferred;
   transmitting, by the server, value packet transfer information to the second mobile terminal, the value packet transfer information including a value amount and a displayed content determined according to the value packet transmitting instruction; and
   receiving, by the server from the second mobile terminal, a value packet transfer result, the value packet transfer result including a value amount of a value packet obtained by the second mobile terminal and a corresponding displayed content.

2. The method according to claim 1, wherein the value amount is determined for a to-be-transferred value packet, and the displayed content is determined for the to-be-transferred value packet; and
   before the transmitting, value packet transfer information to a second mobile terminal, the method further comprises:
   determining, by the server according to the quantity of value packets, displayed contents of which a quantity is equal to the quantity of the value packets, from a preset content database, the value packets being in a one-to-one correspondence to the displayed contents.

3. The method according to claim 2, wherein after the determining, the method further comprises:
   determining, by the server according to the displayed content corresponding to the value packet, a value amount corresponding to the value packet, from a total amount of value packets that need to be transferred, a value amount of a value packet corresponding to a displayed content satisfying a preset condition being greater than a value amount of a value packet corresponding to a displayed content not satisfying the preset condition.

4. The method according to claim 3, further comprising:
   transmitting, by the server in a case that there is a non-transferred value packet after a preset duration, a value amount and a displayed content that correspond to the non-transferred value packet to the first mobile terminal.

5. An information processing method, comprising:
   receiving chat information from a second mobile terminal to a first mobile terminal;
   extracting, by the first mobile terminal, a key word from the chat information, and matching the key word with a key word library received from a server; and
   transmitting, by the first mobile terminal to a server, a value packet transmitting instruction in a case that the key word is successfully matched, the value packet transmitting instruction including a quantity of value packets and a total amount of value packets that need to be transferred,
   triggering value packet transfer information from the server to the second mobile terminal, the value packet transfer information including a value amount and a displayed content determined according to the value packet transmitting instruction, and
   triggering a value packet transfer result, from the second mobile terminal to the server, the value packet transfer result including a value amount of a value packet obtained by the second mobile terminal and a corresponding displayed content.

6. The method according to claim 5, wherein in a case that the key word is successfully matched, the method further comprises:
   displaying, by the first mobile terminal, value packet transfer prompt information in a chat window; and
   generating, by the first mobile terminal in response to receiving confirmation information of transferring the value packet, the value packet transmitting instruction according to a quantity of to-be-transferred value packets and a total amount of value packets that need to be transferred.

7. The method according to claim 6, wherein the displaying comprises:
   obtaining a quantity of chat objects in the chat window; and
   generating the value packet transfer prompt information according to the quantity of the chat objects in the chat window, a quantity of prompts in the value packet transfer prompt information being equal to the quantity of the chat objects.

8. The method according to claim 7, wherein the quantity of the to-be-transferred value packets is equal to the quantity of the prompts.

9. A system including:
a server, comprising: a server processor and a server memory, the server processor and the server memory communicating with each other;
the server memory being configured to store a server instruction; and
the server processor being configured to execute the server instruction in the server memory, to perform:
transmitting, by the server, a value packet transfer activation instruction to a first mobile terminal, the value packet transfer activation instruction comprising a key word library;
transmitting, by the server, chat information from a second mobile terminal to the first mobile terminal;
receiving, by the server, a value packet transmitting instruction from the first mobile terminal, wherein the value packet transmitting instruction being transmitted after a key word extracted from chat information by the first mobile terminal being matched with the key word library and the value packet transmitting instruction includes a quantity of value packets and a total amount of value packets that need to be transferred; and
transmitting, by the server, value packet transfer information to a second mobile terminal, the value packet transfer information including a value amount and a displayed content determined according to the value packet transmitting instruction; and
receiving, by the server from the second mobile terminal, a value packet transfer result, the value packet transfer result including a value amount of a value packet obtained by the second mobile terminal and a corresponding displayed content.

10. The system according to claim 9, wherein the value amount is determined for a to-be-transferred value packet, and the displayed content is determined for the to-be-transferred value packet; and
before the transmitting, value packet transfer information to a second mobile terminal, the server processor is further configured to execute the server instruction to perform:
determining, by the server according to the quantity of value packets, displayed contents of which a quantity is equal to the quantity of the value packets, from a preset content database, the value packets being in a one-to-one correspondence to the displayed contents.

11. The system according to claim 10, wherein after the determining, the server processor is further configured to execute the server instruction to perform:
determining, by the server according to the displayed content corresponding to the value packet, a value amount corresponding to the value packet, from a total amount of value packets that need to be transferred, a value amount of a value packet corresponding to a displayed content satisfying a preset condition being greater than a value amount of a value packet corresponding to a displayed content not satisfying the preset condition.

12. The system according to claim 11, where the server processor is further configured to execute the server instruction to perform:
transmitting, by the server in a case that there is a non-transferred value packet after a preset duration, a value amount and a displayed content that correspond to the non-transferred value packet to the first mobile terminal.

13. The system according to claim 11, further including the first mobile terminal, the first mobile terminal including a first mobile processor and a first mobile memory, the first mobile processor and the first mobile memory communicating with each other;
the first mobile memory being configured to store a first mobile instruction; and
the first mobile processor being configured to execute the first mobile instruction in the first mobile memory, to perform:
extracting, by the first mobile terminal, the key word from chat information, and matching the key word with the key word library; and
transmitting, by the first mobile terminal, the value packet transmitting instruction in a case that the key word is successfully matched.

14. The system according to claim 13, wherein in a case that the key word is successfully matched, the first mobile processor is further configured to execute the first mobile instruction to perform:
displaying, by the first mobile terminal, value packet transfer prompt information in a chat window; and
generating, by the first mobile terminal in response to receiving confirmation information of transferring the value packet, the value packet transmitting instruction according to a quantity of to-be-transferred value packets and a total amount of value packets that need to be transferred.

15. The system according to claim 14, wherein the displaying comprises:
obtaining a quantity of chat objects in the chat window; and
generating the value packet transfer prompt information according to the quantity of the chat objects in the chat window, a quantity of prompts in the value packet transfer prompt information being equal to the quantity of the chat objects.

16. The system according to claim 13, wherein the quantity of the to-be-transferred value packets is equal to the quantity of the prompts.

17. The system according to claim 11, further including the second mobile terminal including a second mobile processor and a second mobile memory, the second mobile processor and the second mobile memory communicating with each other;
the second mobile memory being configured to store a second mobile instruction; and
the second mobile processor being configured to execute the second mobile instruction in the second mobile memory, to perform:
receiving, by the second mobile terminal, the value packet transfer information, the value packet transfer information being transmitted by the server after the value packet transmitting instruction is received, and the value packet transmitting instruction being transmitted after the key word extracted from chat information by the first mobile terminal is matched with the key word library; and
obtaining, by the second mobile terminal, a transfer instruction for transferring a value packet in the value packet transfer information.

18. The system according to claim 17, where the second mobile processor is further configured to execute the second mobile instruction to perform:

displaying, by the second mobile terminal, a value amount and a corresponding displayed content of a value packet determined according to the transfer instruction; and the displaying, by the second mobile terminal, a value amount and a corresponding displayed content of a value packet determined according to the transfer instruction comprises:
  determining a transmitting time of the transfer instruction; and
  obtaining a value packet from the value packet transfer information according to the transmitting time of the transfer instruction, and displaying a value amount and a displayed content that correspond to the obtained value packet in a chat window.

* * * * *